(12) United States Patent
Steedman Henderson et al.

(10) Patent No.: US 10,847,141 B2
(45) Date of Patent: Nov. 24, 2020

(54) DIALOGUE SYSTEM AND A DIALOGUE METHOD

(71) Applicant: PolyAI Limited, London (GB)

(72) Inventors: Matthew Steedman Henderson, Singapore (SG); Tsung-Hsien Wen, London (GB); Pei-Hao Su, London (GB); Nikola Mrksic, London (GB); Ivan Vulic, London (GB); Inigo Casanueva-Perez, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 16/678,079

(22) Filed: Nov. 8, 2019

(65) Prior Publication Data

US 2020/0152182 A1 May 14, 2020

(30) Foreign Application Priority Data

Nov. 8, 2018 (GB) .................................. 1818234.5

(51) Int. Cl.
*G10L 15/18* (2013.01)
*G10L 15/22* (2006.01)
*G06F 40/30* (2020.01)

(52) U.S. Cl.
CPC .......... *G10L 15/1815* (2013.01); *G06F 40/30* (2020.01); *G10L 15/22* (2013.01); *G10L 2015/223* (2013.01)

(58) Field of Classification Search
CPC . G10L 15/22; G10L 15/1815; G10L 15/1822; G10L 15/063; G10L 2015/223;
(Continued)

(56) References Cited

U.S. PATENT DOCUMENTS 8,366,554 B1 * 2/2013 Yuan ..................... G10L 13/08
463/42
9,189,742 B2 11/2015 London
(Continued)

OTHER PUBLICATIONS

Budzianowski, Pawel et al.; "MultiWOZ—A Large-Scale Multi-Domain Wizard-of-Oz Dataset for Task-Oriented Dialogue Modelling" Conference on Empirical Methods in Natural Language Processing, Brussels, Oct. 31-Nov. 4, 2018; pp. 5016-5026.
(Continued)

*Primary Examiner* — Matthew H Baker
(74) *Attorney, Agent, or Firm* — Bracewell LLP; Christopher L. Drymalla

(57) ABSTRACT

A dialogue system comprising: an input for receiving input data relating to a speech or text signal originating from a user; an output for outputting speech or text information specified by a dialogue act; and a processor configured to: update a belief state, the belief state comprising information corresponding to one or more dialogue options, each dialogue option comprising a slot and a corresponding slot value, based on the input signal; determine a dialogue act, wherein a dialogue act is determined by applying one or more rules to world state information, the world state comprising information relating to the dialogue, wherein rules are applied in two or more ordered stages for each dialogue turn, wherein one of the stages is a first update stage, comprising applying one or more further rules controlling updating of the world state information based on the belief state information, and another of the stages is an act selection stage, comprising determining the dialogue act by applying the one or more rules to the world state information, and wherein the first update stage is before the act selection stage; output speech or text information specified by the determined dialogue act at the output.

20 Claims, 10 Drawing Sheets

(58) Field of Classification Search
CPC ......... G10L 15/16; G10L 15/30; G10L 15/08; G10L 15/18; G10L 2015/228; G10L 2015/225; G10L 2015/088; G10L 15/02; G10L 15/183; G10L 2015/0635; G10L 2015/0638; G10L 13/00; G10L 15/065; G10L 15/10; G10L 15/12; G10L 15/142; G10L 15/265; G10L 25/51; G10L 13/02; G10L 15/14; G10L 15/26; G10L 2015/226; G10L 25/90; G10L 15/005; G10L 15/06; G10L 15/083; G10L 15/144; G10L 15/222; G10L 15/24; G10L 15/32; G10L 17/22; G10L 25/18; G10L 25/21; G10L 25/24; G10L 13/027; G10L 13/033; G10L 15/1807; G10L 15/20; G10L 2015/227; G10L 2021/02082; G10L 2021/02166; G10L 21/0208; G10L 25/63; G10L 13/08; G10L 13/043; G10L 15/197; G06F 17/279; G06F 17/2785; G06F 16/3329; G06F 17/2881; G06F 17/274; G06F 17/27; G06F 16/90332; G06F 3/167; G06F 16/243; G06F 16/367; G06F 17/2765; G06F 19/00; G06F 16/9535; G06F 17/2705; G06F 17/278; G06F 1/1694; G06F 2203/0381; G06F 3/01; G06F 3/013; G06F 3/017; G06F 9/4843; G06F 17/142; G06F 17/2775; G06F 17/28; G06F 17/30654; G06F 17/30976; G06F 21/6245; G06F 3/0488; G06F 3/0489; G06F 9/451; G06F 9/547
See application file for complete search history.

(56) References Cited

U.S. PATENT DOCUMENTS

| | | | |
|---|---|---|---|
| 10,424,302 | B2 | 9/2019 | Shah et al. |
| 2005/0261881 | A1 | 11/2005 | Jackson |
| 2010/0153324 | A1 | 6/2010 | Downs et al. |
| 2012/0166469 | A1 | 6/2012 | Cammert et al. |
| 2016/0171514 | A1 | 6/2016 | Frank et al. |
| 2017/0069000 | A1 | 3/2017 | Duleba |
| 2017/0193020 | A1 | 7/2017 | Yi et al. |
| 2018/0052842 | A1 | 2/2018 | Hewavitharana et al. |
| 2018/0052884 | A1 | 2/2018 | Kale et al. |
| 2018/0052885 | A1 | 2/2018 | Gaskill et al. |
| 2018/0052913 | A1 | 2/2018 | Gaskill et al. |
| 2018/0114142 | A1 | 4/2018 | Mueller |
| 2018/0173698 | A1 | 6/2018 | Dubey et al. |
| 2018/0196881 | A1 | 7/2018 | Lundin et al. |
| 2018/0203833 | A1* | 7/2018 | Liang ............... G06F 40/30 |
| 2018/0285465 | A1 | 10/2018 | Schaffernoth et al. |
| 2018/0296925 | A1* | 10/2018 | Yuan ................. A63F 13/47 |
| 2018/0330721 | A1* | 11/2018 | Thomson ........... G10L 15/1815 |
| 2018/0341871 | A1 | 11/2018 | Maitra et al. |
| 2018/0349412 | A1 | 12/2018 | Waldeck et al. |
| 2019/0012371 | A1 | 1/2019 | Campbell et al. |
| 2019/0122111 | A1 | 4/2019 | Min et al. |
| 2019/0130904 | A1 | 5/2019 | Homma et al. |
| 2019/0188537 | A1 | 6/2019 | Dutta et al. |
| 2019/0349321 | A1 | 11/2019 | Cai et al. |
| 2020/0074984 | A1 | 3/2020 | Ho et al. |

OTHER PUBLICATIONS

Burgan, Deeno; "Dialogue Systems & Dialogue Management" Australian Government, Department of Defence Science and Technology, Jan. 2017; pp. 1-71.

El Asri, Layla et al.; "Frames: A Corpus for Adding Memory to Goal-Oriented Dialogue Systems" (2017) available at: https://protect-eu.mimecast.com/s/b-jyCOYPASA6w78cQeEA5?domain=aclweb.org;pp. 1-13.

Larsson, S. et al.; "Information state and dialogue management in the TRINDI Dialogue Move Engine Toolkit" Natural Language Engineering 1 (1): 000 000, Mar. 26, 2000; pp. 1-17.

Lemon, Oliver et al.; "Probabilistic Dialogue Modelling" Third SIGdial Workshop on Discourse and Dialogue, Philadelphia, Jul. 2002; pp. 125-128.

Li, Xiujun et al.; "A User Simulator for Task-Completion Dialogues" arXiv:1612.05688v3 [cs.LG] Nov. 13, 2017; pp. 1-14.

Lison, Pierre et al.; "OpenDial: A Toolkit for Developing Spoken Dialogue Systems with Probablistic Rules" 54th Annual Meeting of the Association for Computational Linguistics, Berlin, Aug. 7-12, 2016; pp. 67-72.

Lison, Pierre; "A hybrid approach to dialogue management based on probablistic rules" Computer Speech and Language 34 (2015); pp. 232-255.

Liu, Bing et al.; "Dialogue Learning with Human Teaching and Feedback in End-to-End Trainable Task-Oriented Dialogue Systems" NAACL-HLT 2018, New Orleans, Jun. 1-6, 2018; pp. 2060-2069.

Miller, Alexander H. et al.; "ParlAI: A Dialogue Research Software Platform" 2017 EMNLP System Demonstrations, Copenhagen, Sep. 7-11, 2017; pp. 79-84.

Morbini, Fabrizio et al.; "FLoReS: A Forward Looking, Reward Seeking, Dialogue Manager" 4th International Workshop on Spoken Dialogue Systems, Ermenonville, Nov. 28-30, 2012; pp. 1-12.

Peng, Baolin et al.; "Composite Task-Completion Dialogue Policy Learning via Hierarchical Deep Reinforcement Learning" 2017 Conference on Empirical Methods in Natural Language Processing, Copenhagen, Sep. 7-11, 2017; pp. 2231-2240.

Ren, Hang et al.; "Optimizing Human-Interpretable Dialog Management Policy Using Genetic Algorithm" arXiv:1605.03915v2 [cs.HC] May 13, 2016; pp. 1-9.

Roy, Nicholas et al.; "Spoken Dialogue Management Using Probabilistic Reasoning" 38th Annual Meeting of the Association for Computational Linguistics, Hong Kong, Oct. 2000; pp. 1-8.

Schatzmann, Jost et al.; "Agenda-Based User Simulation for Bootstrapping a POMDP Dialogue System" NAACL HLT 2007, Companion Volume, Rochester, Apr. 2007; pp. 1-4.

Shah, Pararth et al.; "Bootstrapping a Neural Conversational Agent with Dialogue Self-Play, Crowdsourcing and On-Line Reinforcement Learning" NAACL-HLT 2018, New Orleans, Jun. 1-6, 2018, pp. 41-51.

Shah, Pararth et al.; "Building a Conversational Agent Overnight with Dialogue Self-Play" arXiv:1801.04871v1 [cs.AI], Jan. 15, 2018; pp. 1-11.

Shi, Chen et al.; "Auto-Dialabel: Labeling Dialogue Data with Unsupervised Learning" 2018 Conference on Empirical Methods in Natural Language Processing, Brussels, Oct. 31-Nov. 4, 2018; pp. 684-689.

Su, Pei-Hao et al.; "On-line Active Reward Learning for Policy Optimization in Spoken Dialogue Systems" 54 Annual Meeting of the Association for Computational Linguistics, Berlin, Aug. 7-12, 2016; pp. 2431-2441.

Wei, Wei et al.; "AirDialogue: An Environment for Goal-Oriented Dialogue Research" 2018 Conference on Empirical Methods in Natural Language Processing, Brussels, Oct. 31-Nov. 4, 2018; pp. 3844-3854.

Wen, Tsung-Hsien et al.; "A Network-based End-to-End Trainable Task-oriented Dialogue System" 15th Conference of the European Chapter of the Association for Computational Linguistics, Valencia, Apr. 3-7, 2017; pp. 438-449.

Williams, Jason D. et al.; "Hybrid Code Networks: practical and efficient end-to-end dialog control with supervised and reinforcement learning" arXiv:1702.03274v2 [cs.AI] Apr. 24, 2017; pp. 1-13.

Xu, Yushi et al.; "Dialogue Management Based on Entities and Constraints" 11th Annual Meeting of the Special Interest Group on Discourse and Dialogue, University of Tokyo, Sep. 24-25, 2010; pp. 87-90.

* cited by examiner

```
INFORMABLE SLOTS: {
    PRICE RANGE: [
        cheap,
        moderate,
        expensive
    ],
    AREA: [
        centre,
        north,
        west,
        south,
        east
    ],
    FOOD: [
        Afghan, African, Afternoon Tea, Asian, Australian,
        Austrian, Barbeque, Basque, Belgian, Bistro, Brazilian,
        British, Cantonese, Caribbean, Catalan, Chinese,
        Christmas, Corsican, Creative, Crossover, Cuban,
        Danish, Dutch, English, Eritrean, French, Fusion...
    ],
    NAME: [
        Ali Baba, Anatolia, Ask, Backstreet Bistro,
        Bangkok City, Bedouin, Bloomsbury,
        Caffe Uno, Cambridge Lodge, Charlie Chan,
        Chiquito Restaurant Bar, City Stop Restaurant,
        Clowns Cafe, Cocum, Cote, Curry Garden,
        Curry King, Curry Prince, Curry Queen...
    ]
},
REQUESTABLE SLOTS: [
    Postcode,
    Address,
    Area,
    Food,
    Phone,
    Price Range,
    Signature,
    Name
]
```

Figure 2(b)

DIALOGUE SYSTEM AND A DIALOGUE METHOD

CROSS-REFERENCE TO RELATED APPLICATIONS

This application is based upon and claims the benefit of priority from prior United Kingdom Application number 1818234.5 filed on Nov. 8, 2018, the entire contents of which are incorporated herein by reference.

FIELD

The present invention relates to a dialogue system and a dialogue method.

BACKGROUND

Dialogue systems, or conversational user interfaces, for example chatbots or voice-based agents, are used in many applications, for example voice or chat-based search, recommendation, and booking.

There is a continuing need to improve the functioning and efficiency of dialogue systems.

BRIEF DESCRIPTION OF FIGURES

Systems and methods in accordance with non-limiting embodiments will now be described with reference to the accompanying figures in which:

FIG. 2(b) shows an example of a simple domain ontology which relates to the domain of restaurants in Cambridge, for the task of restaurant search and reservation;

DETAILED DESCRIPTION

Figure 1:
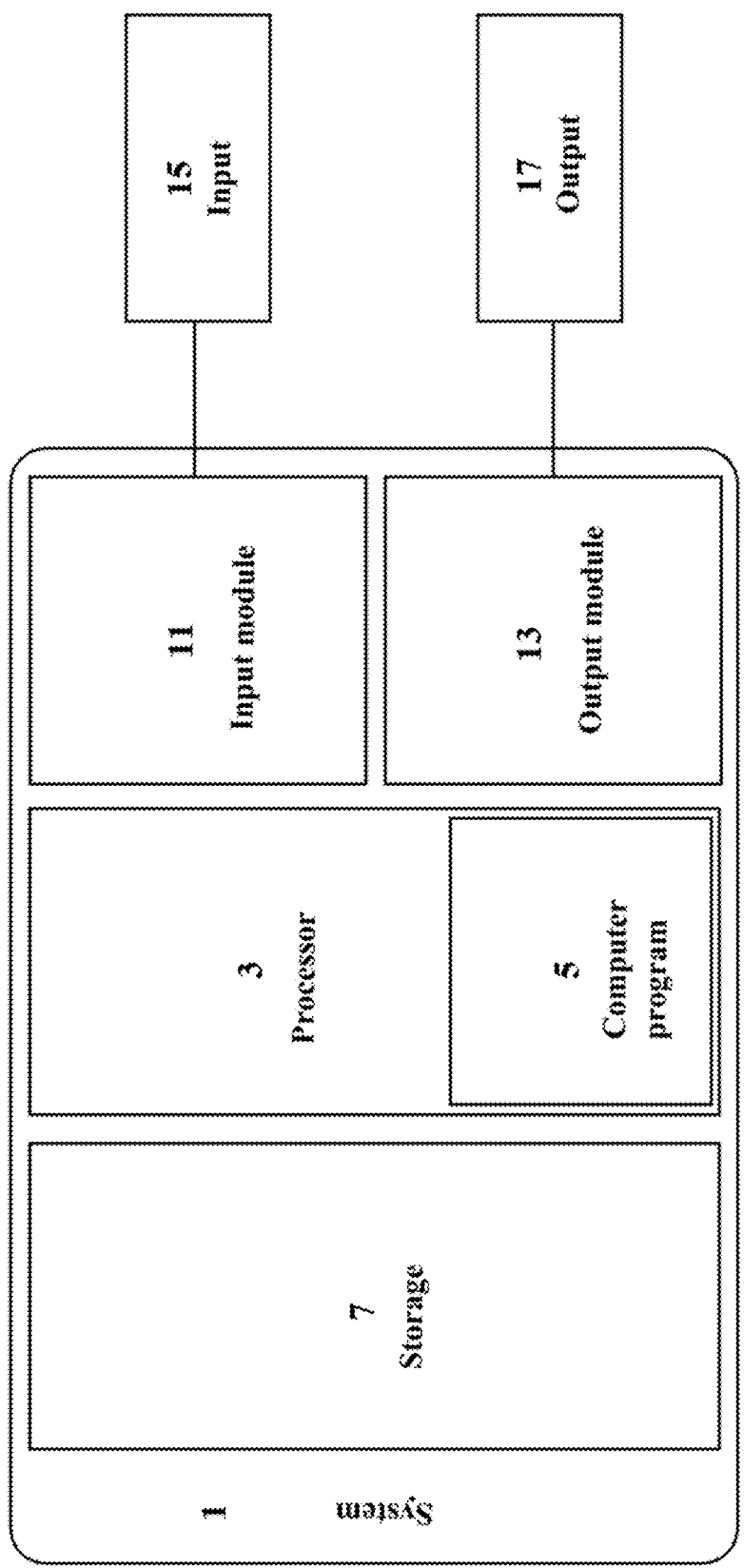
FIG. 1 shows a schematic illustration of a dialogue system in accordance with an embodiment.

According to an embodiment, there is provided a dialogue system comprising:
an input for receiving input data relating to a speech or text signal originating from a user;
an output for outputting speech or text information specified by a dialogue act; and
a processor configured to:
update a belief state, the belief state comprising information corresponding to one or more dialogue options, each dialogue option comprising a slot and a corresponding slot value, based on the input signal;
determine a dialogue act, wherein a dialogue act is determined by applying one or more rules to world state information, the world state comprising information relating to the dialogue;
output speech or text information specified by the determined dialogue act at the output.

Rules are applied in two or more ordered stages for each dialogue turn, wherein one of the stages is a first update stage, in which one or more further rules control updating of the world state information based on the belief state information, and another of the stages is an act selection stage, in which the dialogue act is determined by applying the one or more rules to the world state information, and wherein the update stage is before the act selection stage.

The disclosed system provides an improvement to computer functionality by allowing computer performance of a function not previously performed by a computer. Specifically, the disclosed system provides for the retrieval of suitable responses without the need to pre-specify the possible conversational pathways. The system achieves this by storing world state information, relating to the dialogue, and applying rules to the world state information to determine the responses. The rules are organised in two or more ordered stages and within the stages, the rules may be applied simultaneously or in any order.

Furthermore, the disclosed system addresses a technical problem tied to computer technology and arising in the realm of computer networks, namely the technical problem of resource utilization. The disclosed system solves this technical problem by applying rules to stored world state information, rather than using pre-specified conversational pathways or states. The system is not required to store information specifying possible conversational pathways or states, or to track the state and pathway of the dialogue and update the state and pathway of the dialogue for each dialogue turn. Rather, the system applies a single set of rules for each dialogue turn.

The world state stores information relating to the dialogue. For example, the world state stores information from current and previous belief states, as well as external information. The world state may further store information relating to current and previous selected dialogue acts. As well as determining the dialogue acts, the rules may also control entry and removal of information into the world state. By conditioning the rules on the world state, rather than just on the belief state for example, it is possible to take contextual information into account when selecting output dialogue acts (for example whether the current belief state and the previous belief state match).

In an embodiment, one or more one or more further rules may be applied to belief state information. A dialogue acts may be determined by applying a rule or rules to belief state information. Some dialogue acts may be determined by rules applied to belief state information, whereas other dialogue acts may be determined by rules applied to world state information.

In an embodiment, one of the stages is a first update stage, in which the rules control updating of the world state information based on the belief state information and/or any other information extracted from the input user utterance.

In an embodiment, another of the stages is a second update stage, in which the rules control updating of the world state information based on external information. The first update stage may be performed before the second update stage. In this way, the external information is obtained based on the up to date belief state information.

In an embodiment, one of the stages is an act selection stage, in which the rules determine a dialogue act. The act selection stage may be performed after any update stage or stages. In this way, the act selection is made based on up to date information.

One or more of the stages may comprise two or more rules. Rules may comprise a condition relating to the world state information and/or belief state information. If the condition is met, the world state information is updated, or a particular dialogue act is selected for example.

If two or more dialogue acts are selected, the output speech or text information may be specified by the two or more dialogue acts. Alternatively, the dialogue act or acts with the highest importance score are selected, such that the output speech or text information is specified by the dialogue act or acts with the highest importance score.

In an embodiment, one or more first rules comprise a condition that if a required slot is not set in the belief state information, the dialogue act comprises a request for the slot value. There may be a plurality of required slots, each corresponding to a rule comprising a condition that if the required slot is not set, the dialogue act comprises a request for the slot value. This is an example of a dialogue act determined by applying a rule or rules to belief state information.

In an embodiment, a second rule comprises a condition that if one or more of the required slots are set in the belief state information, the world state is updated based on the belief state information. The second rule may require that all of the required slots are set in the belief state information.

In an embodiment, the world state comprises information relating to the current belief state and information relating to the previous belief state. The world state may further comprise external information for example such as the outcome of a third party action.

In an embodiment, a third rule comprises a condition that if the information in the world state relating to the current belief state and the information in the world state relating to the previous belief state do not match, the dialogue act comprises a confirmation. This is an example of a dialogue act determined by applying a rule or rules to world state information.

In an embodiment, a fourth rule comprises a condition that if the information in the world state relating to the current belief state and the information in the world state relating to the previous belief state match, a third party action is taken and the world state information is updated based on the outcome of the third party action. The third party action may be a booking action.

According to an embodiment, there is provided a dialogue method comprising:
  receiving input data relating to a speech or text signal originating from a user;
  updating a belief state, the belief state comprising information corresponding to one or more dialogue options, each dialogue option comprising a slot and a corresponding slot value, based on the input signal;
  determining a dialogue act, wherein a dialogue act is determined by applying one or more rules to world state information, the world state comprising information relating to the dialogue;
  outputting speech or text information specified by the determined dialogue act at the output.

Rules are applied in two or more ordered stages for each dialogue turn, wherein one of the stages is a first update stage, in which one or more further rules control updating of the world state information based on the belief state information, and another of the stages is an act selection stage, in which the dialogue act is determined by applying the one or more rules to the world state information, and wherein the update stage is before the act selection stage.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

According to an embodiment, there is provided a carrier medium comprising computer readable code configured to cause a computer to perform any of the above methods.

FIG. 1 shows a schematic illustration of a dialogue system 1 in accordance with an embodiment.

The system 1 comprises a processor 3, and takes an input speech signal or text signal and outputs a speech or text signal. A computer program 5 is stored in non-volatile memory. The non-volatile memory is accessed by the processor and the stored code is retrieved and executed by the processor 3. The processor 3 may comprise logic circuitry that responds to and processes the instructions in the stored code. The storage 7 stores data that is used by the program 5. Information stored in the storage 7 will be described in further detail in relation to FIG. 7 below.

The system 1 further comprises an input module 11 and an output module 13. The input module 11 is connected to an input 15 for receiving the signal. The input 15 may be a receiver for receiving data from an external storage medium or a network. Alternatively, the input 15 may comprise hardware such as a microphone or keyboard. Connected to the output module 13 is output 17. The output 17 may comprise hardware, such as a speaker or screen. Alternatively, the output may be a transmitter for transmitting data to an external storage medium or a network.

The system may further comprise means of communication with third-party services. For example, the system may be configured to communicate with a restaurant system when attempting to finalise a restaurant booking process (to check availability for a particular date, time, and number of people for example). The communication means may comprise a connection to a communication network for example.

In an embodiment, the system 1 may be located in a common system with hardware such as a microphone, keyboard and/or speaker for inputting and outputting signals. Alternatively, the system 1 may be a remote system 1, which receives data regarding the input signal transmitted from another unit, and transmits data regarding the output signal to the same or a different unit. For example, the system may be implemented on a cloud computing system, which receives and transmits data. Although in the described system, a single processor 3 located in a device is used, the system may comprise two or more remotely located processors configured to perform different parts of the processing and transmit data between them.

In use, the system 1 receives data corresponding to the input signal through data input 15. The program 5, executed on processor 3, outputs data corresponding to the output signal through the output 17 in the manner which will be described with reference to the following figures.

Figure 2A:
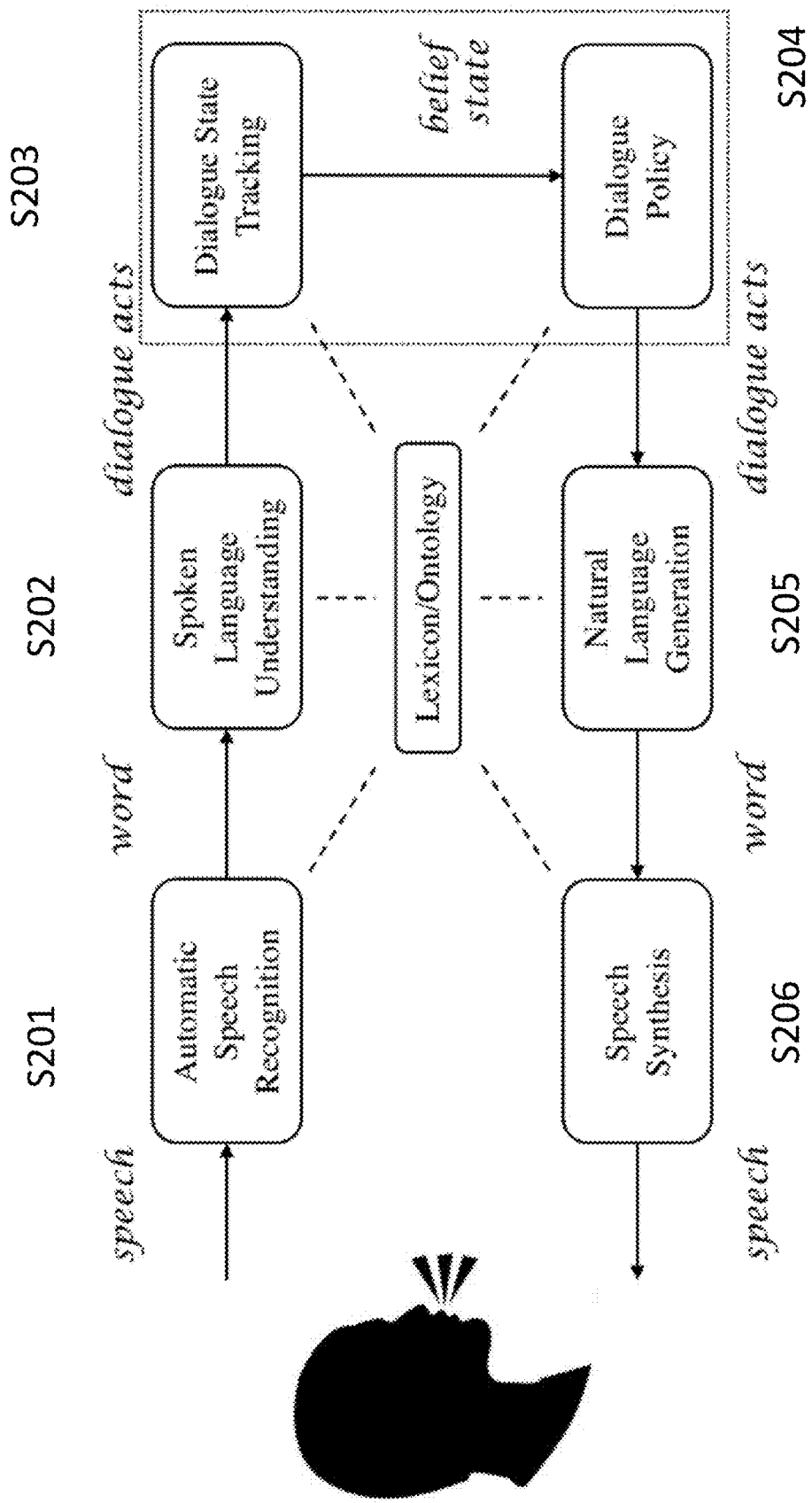
FIG. 2(a) shows a schematic illustration of a dialogue method in accordance with an embodiment, in which a dialogue system interacts with a human user.

FIG. 2(*a*) shows a schematic illustration of a dialogue method in accordance with an embodiment, in which a dialogue system interacts with a human user. The figure shows a modular architecture of a goal-oriented spoken dialogue system. The method comprises a number of stages. Each stage S201 to S206 can be considered a separate module. These stages will be discussed briefly in relation to this figure to give an overview of the system operation, and then in detail in relation to the further figures below.

The dialogue system is a goal-oriented dialogue system. The term goal-oriented may be used interchangeably with the term task-oriented. Goal-oriented dialogue systems search and interact with large databases which contain information about a specific dialogue domain. The goal-oriented dialogue system helps the user achieve their goals (i.e. accomplish tasks) within the particular dialogue domain. Examples of such domains are 1) restaurant search and reservation, 2) flight bookings, 3) tourist information, 4) laptop shopping, and 5) train ticket sales, amongst others.

Each dialogue domain is defined by the domain ontology. The domain ontology comprises information which can be used to model the user goal expressed up to a given point of the conversation. This point of the conversation is referred to as dialogue state. The domain ontology comprises one or more slots. Each dialogue slot corresponds to a subject that a speech or text signal may relate to. The dialogue slots may have one or more corresponding values. The dialogue slot may take on one or more of the values.

A dialogue state thus comprises a set of one or more slots with their corresponding slot values. A dialogue state can contain more than one slot, and value combination, for example, a dialogue state can be specified by the fact that both food type and desired area are known at that point in the dialogue, so both the food type slot and area slot have a corresponding value or values.

An example of a simple domain ontology which relates to the domain of restaurants in Cambridge, for the task of restaurant search and reservation, is provided in FIG. 2(*b*). In this example ontology, there are a plurality of informable slots. The informable slots comprise: "price range", "area", "food", and "name". Each informable slot may take on one or more values. For the "price range" slot, the values are "cheap", "moderate", and "expensive" for example. For the "food" slot, the values are "Afghan", "African", "Afternoon tea", . . . . The informable slots represent attributes which the user can use to constrain the search for an entity in the database (e.g. the food slot is used to constrain the search for a restaurant in a database of restaurants), and have corresponding values (e.g. Afghan).

The ontology may further comprise a set of requestable slots. The set of requestable slots are slots which do not have corresponding values, such as the slots "postcode", "address", "signature", . . . . The requestable slots represent attributes relating to the entities in the database which the users can ask about, but not use as search constraints.

A dialogue system for restaurant search and reservation should help the users to find and book a restaurant according to their personal taste and wishes: for example the system should book a place with cheap Thai food in central Cambridge, or recommend a cheap Chinese place in North Cambridge if the user makes inquiries about such places.

As described above, the dialogue states are defined by the domain-specific ontology. A dialogue state comprises the constraints the users can express using a collection of one or more slots (e.g. "price range" or "food") and their slot values (e.g. "cheap", "moderate", "expensive", or "Thai", "Chinese", "British", "European", "American" for the two aforementioned slots).

The system receives an audio input from a human user. The audio input may be received through a microphone located remotely from the system, and the audio signal transmitted to the dialogue system for example. Each audio input corresponds to a turn in the dialogue. A dialogue turn is a conversational unit within turn-taking dialogues, which comprises the previous system utterance and the current user utterance.

In S201, an automatic speech recognition (ASR) step is performed, to generate a text signal from the audio input. The generated text signal may be referred to as a text hypothesis. Any type of speech recognition process may be used in the speech recognition step. For example, a trained speech recognition algorithm based on a neural network or Hidden Markov Model may be used. ASR models may assign posterior probabilities to words in an utterance given the input acoustic signal. The ASR output may take the form of an N-best list, which approximates the full posterior distributions over the ASR hypotheses by returning the top N most probable hypotheses with their respective probabilities. Alternatively, word lattices or word confusion networks may be used. In an embodiment, only the top scoring ASR hypothesis is used as input to the subsequent steps.

Although a method in which an audio input is received is discussed here, alternatively the user may directly input a text signal (rather than speaking). In this case, the speech recognition step S201 may be omitted.

In S202, a spoken language understanding step is performed. This gives a "turn-level" prediction. Although the term "spoken" language is used, as explained above, the input signal may in fact be a text signal. A dialogue state tracking stage is performed in S203, which generates an updated belief state. The belief state comprises the system estimate of dialogue state information, for example the system estimate of the slot value combinations that have been mentioned by the user. The spoken language step and dialogue state tracking step together form a natural language understanding (NLU) stage.

The output of the step S203 is an updated belief state. As described above, the dialogue state comprises one or more slot-value combinations. The belief state comprises the system's estimation of dialogue state information. In the belief state, a probability value may be assigned to slot value combinations. Combinations not in the belief state are considered to have a probability of 0.

A dialogue management step is then performed in S204, in which a system act is determined. The updated belief state is taken as input. Other information may also be extracted from the input utterance and inputted to the dialogue management model, for example the system estimate of the user act type, or action and/or the system estimate of any requestable slots mentioned. In this step an appropriate system response is selected following the latest user utterance. This selection is made based on the user utterance, dialogue context (i.e. history of the current conversation), and any additional external information (such as the result of a booking attempt). The dialogue manager uses the updated belief state to determine the system act, which is the dialogue act representation of the dialogue system's response to the user utterance. The terms dialogue management and dialogue policy model are used interchangeably in this specification.

The system and user dialogue acts comprise one or more dialogue act types. Dialogue act types correspond to the general action of the utterance. A set of pre-defined dialogue act types are used to generate the system dialogue acts. Each dialogue act type has a corresponding dialogue act argument. The argument may be empty, for example where the act type is "greeting". In task-based systems, the argument may be one or more slot-value pairs. For request acts, the dialogue act argument may be an attribute of an entity. Examples of dialogue acts include inform(food=British) or request(address).

The chosen system act is then run through the Natural Language Generation (NLG) module to construct and output the system utterance from the dialogue act in S205. Thus in S205, a natural language generation step is performed to generate a textual response based on the system action.

In S206, text to speech generation is performed to generate a speech signal, which is then output to the user as an audio signal. Any type of text to speech generation process may be used in this step. This step may alternatively be omitted, and the text signal output directly to the user, on a screen for example.

Omitting steps S201 and/or S206 means that the system operates with text, which removes the need for speech-to-text and text-to-speech modules. Operating with text input and/or output can also allow hearing impaired and mute people to use the system for example. The system may be configured to work with both text and audio signals, where S201 and S206 are included or omitted for each input signal as required by the user.

The dialogue management in step S204 is performed using a rule based approach. Unlike for dialogue management performed based on learning-based methods such as reinforcement learning and supervised learning for example, this may enable changes to be implemented easily (by simply changing, removing or adding the relevant rules) and also does not require large amounts of domain-specific data to train the dialogue manager. The naturalness of the dialogue may also be improved using a rules based method.

The rules are organised in two or more stages or groups. The stages are ordered such that the rules for a second stage are only applied after the rules of the first stage, and so on. Within the stages, the rules may be applied simultaneously or in an arbitrary order. In an embodiment, the stages are ordered such that a stage or stages comprising rules relating to a world state update are prior to a stage comprising rules relating to act selection, ensuring that the final selected dialogue act or acts correspond to up to date dialogue information. The world state comprises stored information relating to the dialogue and will be described in more detail below.

In an embodiment, the dialogue management is based on a hybrid dataflow-control flow paradigm.

A control flow approach controls the flow of a dialogue using a pre-defined sequence of steps that represent the state of the dialogue at any point during the conversation, for example in a finite state machine. In the hybrid approach, unlike a purely control flow based method, it is not required to specify every single possible conversational pathway explicitly. In other words it does not require the developer to account for all possible conversational scenarios that the user might try to follow. Instead, a number of rules are applied together (i.e. simultaneously, or in any order) within ordered stages at each dialogue turn. Thus rather than the dialogue act being determined by a state, the dialogue act is determined by a set of rules, which are applied in stages. The stages have a fixed order. The stages do not correspond to a specific dialogue state, but rather to a general rule function (e.g. world state update or act selection). For larger domains in particular, the process of adding new capabilities to the system may be made efficient, since new rules can simply be created and slotted into the appropriate stage.

In a data flow approach, a number of {if X then Y} rules are applied, and a rule engine handles the connections between the rules automatically. Multiple components can process data at the same time and multiple conditions may be evaluated and fulfilled in the same dialogue turn. In the hybrid approach, unlike a purely data flow approach, the system response is separated into several dialogue stages. In each stage, a data flow mechanism decides over the triggered rules, i.e. the rules for which the condition is fulfilled. The stages define the order in which the rules are applied.

Thus multiple stages of processing are pre-specified with an order, in a control flow approach, but at the same time, at each stage, rules are applied in a data flow approach. Control of the dialogue management specification is maintained without the need to pre-specify all possible dialogue states. The policy is implemented by matching a set of propositions that allow the system to use a given rule to output a certain set of dialogue acts and transition to a different state.

Figure 2C:
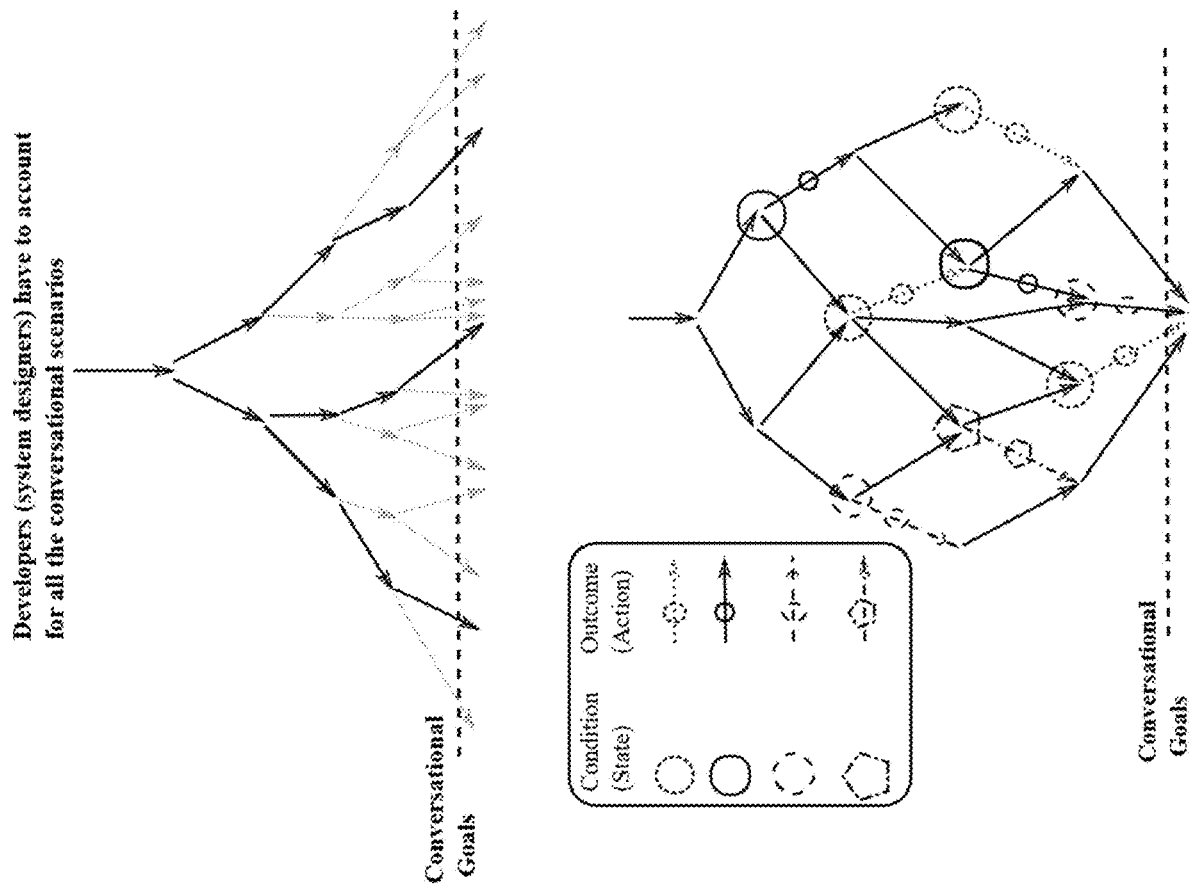
FIG. 2(c) shows an illustration of an example control flow based method in the upper figure and a hybrid method according to an embodiment in the lower figure.

FIG. 2(c) shows a control flow based method in the upper figure, and a hybrid method according to an embodiment in the lower figure. In the control flow method, each possible state is pre-specified, and the system response corresponding to each possible state pre-determined. For example, in a restaurant booking scenario, a separate state (and corresponding selected dialogue act) is pre-specified for the case where, in the first dialogue turn the user supplies the restaurant name, date and party size, and where in the first dialogue turn the user supplies the restaurant name, date, but not the party size. In the hybrid approach, a rule may be applied to determine if the user has supplied the booking date for example (regardless of the other information and regardless of which turn). For example, the points indicated by the dotted circles in the lower figure may be considered to correspond to dialogue turns in which the booking date is supplied. Even though this happens at different stages in the dialogue, the same dialogue act is triggered in each case. The same dialogue act can trigger based on the same rule at different points in the dialogue. Thus the same components can be used to tailor different conversations and it is not required to pre-specify all possible conversation scenarios.

Figure 3A:
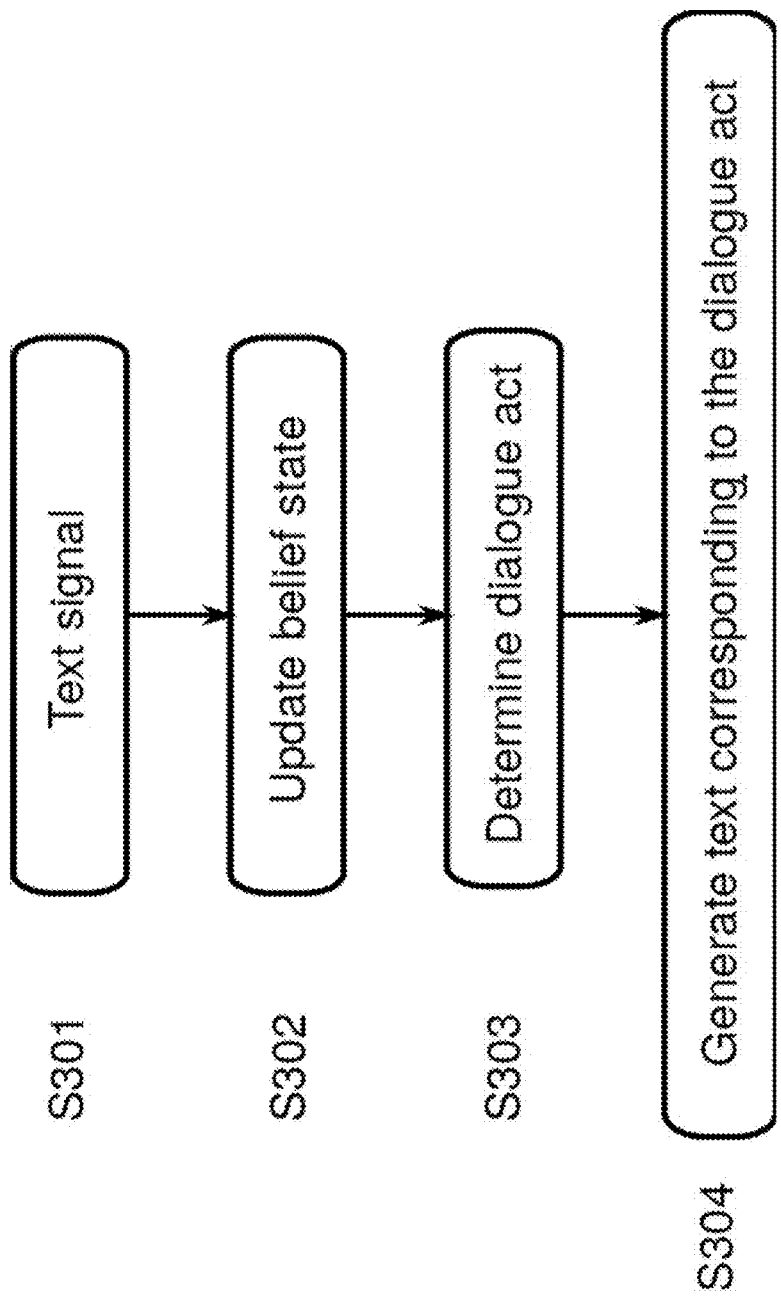
FIG. 3(a) shows a flow chart illustrating the processing stages included in a dialogue method according to an embodiment.

FIG. 3 shows a flow chart illustrating the processing stages included in a dialogue method according to an embodiment. The method is performed by a statistical goal-oriented dialogue system.

In step S301, a text signal is inputted. The text corresponds to a turn in a dialogue. As described above, the text signal may be generated from an input audio signal using an automatic speech recognition method for example, generating a text signal from the speech signal. Alternatively, it may be directly inputted by the user. The input signal may be "I would like Chinese or Greek food" for example.

In S302, a belief state is updated based on the input text signal S301. The belief state comprises a probability value corresponding to each of a plurality of dialogue options, each dialogue option comprising a slot and a corresponding slot value.

The belief state update based on the input text signal may be performed using various methods. The belief state update step S302 may comprise spoken language understanding (SLU) and dialogue state tracking (DST) for example.

The role of a Spoken Language Understanding (SLU) module, also known as a semantic decoder, is to convert text (i.e. input text or ASR output) into dialogue state information. The subsequent Dialogue State Tracking (DST) module uses this information to update the system's belief state, which is a probability distribution over possible dialogue options (e.g. slot and value combinations). This distribution is then used by the dialogue manager in S303 to choose an appropriate system response, i.e. a dialogue act, in the manner that will be described below.

SLU may use rule-based methods such as template matching or grammar-based methods for example. User testing may be performed to tune the rules to achieve satisfactory performance. Alternatively, data-driven methods can be used, in which statistical models learn from annotated data. Techniques including Inductive Logic Programming, Generative Probabilistic Models, Weighted Finite State Transducers, Support Vector Machines and many others may be used for example. SLU may also be treated as a sequence labelling problem, where each word in an utterance is labelled according to its role in the user's intent. Labelling models such as Conditional Random Fields or Recurrent Neural Networks can be used. An example method is described below, but as may be appreciated, other methods of SLU may be used.

In an embodiment, the SLU module comprises a plurality of independent binary statistical models (for example artificial neural networks), each trained to decide whether a specific slot-value pair was expressed in an input user utterance. Given annotated training data, these models can learn which lexical features are good indicators for a given value and can capture elements of paraphrasing. During implementation, features representing the input text signal from S301 are extracted and inputted into the binary models. For example, vector representations of words in the utterance may first be extracted. A single fixed length feature vector representing the utterance may then be generated from the vector representations, for example using a convolutional neural network. Features from the previous system act may also be included. Each model gives a binary output, indicating a probability that the slot value pair corresponding to the model was expressed in the utterance. The SLU module therefore outputs a probability value corresponding to each slot value pair, indicating the probability that the value was mentioned.

During training, the same features are extracted and inputted into the binary models. Again, each model gives a binary output, indicating a probability that the slot value pair corresponding to the model was expressed in the training utterance. The training data further comprises labels indicating the slots and values mentioned in the utterance, and these are therefore used to train the models to correctly determine whether the slot value pair was expressed in the utterance.

In this example, the SLU module therefore outputs a probability value corresponding to each slot value pair. Other types of SLU may be performed however, resulting in different format outputs. The outputs are then used to update the belief state in the subsequent dialogue state tracking step.

The belief state is the system's estimation of current dialogue state information. For slot-based systems, the dialogue state information comprises constraints that the user has expressed up to that point in time. For example, the dialogue state may comprise goal constraints for each of the informable slots, where each goal constraint comprises a value. In an embodiment, the belief state comprises the system estimate of the slot and value combinations mentioned by the user in the dialogue. Additional information may also be determined, for example the system estimate of the user dialogue act type, as will be described below. Requested slots represent questions about previously suggested entities, and as such do not require belief tracking across turns. Thus the belief state may simply comprise slots and values and corresponding probability values.

The DST component uses the output of the SLU step to update the belief state, which comprises a probability distribution over dialogue state information.

Figure 3B:
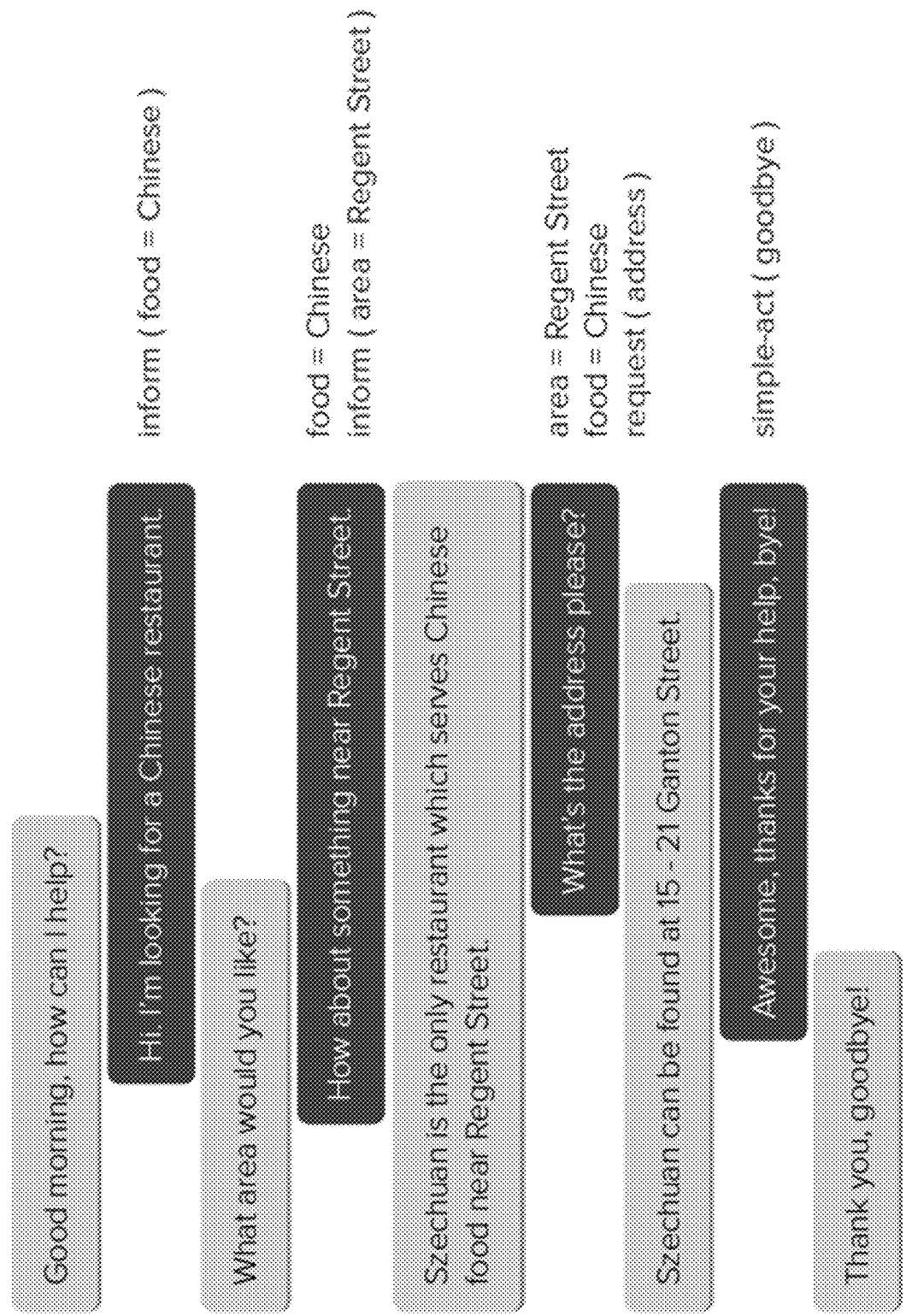
FIG. 3(b) shows an example dialogue.

FIG. 3(b) shows a sample dialogue with user utterances annotated with the dialogue acts. User goals in a dialogue are represented as sets of constraints expressed by slot value pairs. The text shows the slot value constraints the model stores from previous dialogue turns. The role of the DST model is to infer the best possible estimate of dialogue state information, given the history of user and system utterances in the current dialogue.

Dialogue state tracking may be based on hand-crafted systems, for example which use the top ASR/SLU hypothesis to map the existing belief state to a new belief state, for example an Information State Update model, which uses hand-crafted rules to maintain the information state. Other rule-based approaches may predict an updated dialogue state for each of the hypotheses provided by the ASR/SLU pipeline, and then use another hand-crafted rule to combine these estimates into a single belief state.

In an embodiment, a rule-based belief state update depends on two factors: 1) the latest user utterance (i.e., the probability distributions over the slot and value combinations generated in the SLU step); and 2) previous belief state history (in this case the previous belief state, i.e. the probability distributions over the slot and value combinations stored in the belief state after the previous dialogue turn). The most recent belief state reflects previous state history. The relative weight of the impact of the two components determines the accuracy of the current belief state. For instance, if a complete change in the user's goal is detected, the previous belief state history is weighted less, and more weight is assigned to the latest user input. An example belief state may be (Food=Indian=0.8, Food=Chinese=0.9, Area=North=0.9, . . . ).

Alternatively, data-driven methods may be used. Data driven methods may be based on a generative approach or a discriminative approach. For example, generative Bayesian networks model dialogue as a dynamic Bayesian network where the (true) dialogue state $s_t$ (at time t) is treated as a hidden random variable. The system action $a_t$ and the observed user action $o_t$ are the observed variables. At each dialogue turn, Bayesian inference is used to obtain an updated estimate of the dialogue state $s_{t+1}$. Unlike generative models, discriminative models directly estimate the conditional probability $P(s_t|f)$, where f is the set of (arbitrary) features representing (optionally) ASR, SLU and dialogue history for example.

SLU and DST components may be separate, with the DST module operating on SLU output to update the belief state. However, models based on word-based DST paradigm may integrate SLU and DST into a single component which uses the ASR output (or text input) to directly update the belief state without an intermediate semantic decoding step. Combining the two components enables joint learning, allowing both components to make use of the information expressed in previous dialogue turns.

Alongside the SLU and DST steps which update the belief state, a dialogue act classifier or classifiers may be run, in order to determine the system estimate of the user dialogue act. Whereas the belief state stores information relating to the slot and value combinations mentioned in the dialogue, the dialogue act classifier or classifiers generate information relating to the current user dialogue act type or action, for example identifying one or more of: "inform", "request", "negate", "affirm", "greeting", "unknown", "goodbye" in the user input. The input to the dialogue classifier may be generated using the same vector representations of words in the utterance used in the SLU step. A single fixed length feature vector representing the utterance may then be generated from the vector representations, for example using a convolutional neural network. The same feature vector used in the SLU step for identifying the slot and value combinations may be used. A single multi-way classifier may be used, or multiple binary classifiers, each corresponding to an act type may be used. The classifier or classifiers may be neural networks. The information regarding the estimated dialogue act is also taken as input into the policy model. Alternative models for determination of the input user act type may be used.

Other steps may also be performed to extract further information from the user utterance. For example, one or more requestable slot classifiers may be run, in order to determine the system estimate of the requestable slot or slots mentioned by the user. For example, for the restaurant search and booking task, one or more requestable slot classifiers may be used to identify one or more of: "postcode", "address", "phone" in the user input. These classifiers may again use the same features as input as used in the SLU step and in the dialogue act classifiers. They may comprise multi-layer perceptrons applied on top of the feature representations to perform binary classification. Each classifier corresponds to a requestable slot. The information regarding the probability that the requestable slot was mentioned, for example all requestable slots having a probability higher than a threshold, is also taken as input into the policy model. Alternative models for determination of the requestable slots may be used.

The role of the dialogue manager in S303 is then to choose an appropriate system response following the latest user utterance. To do this, the dialogue manager takes the dialogue system's internal estimate of the dialogue state (the belief state) updated in S302 as input to produce the system act, which is the dialogue act representation of the dialogue system's response to the user utterance. The updated belief state information generated in S302 is therefore taken as input in S303. Other information extracted from the input user utterance may additionally be taken as input, for example the estimated user act type and/or mentioned requestable slots.

The input to the policy component is the flat NLU output, i.e. the updated belief state and any additional information extracted from the input user utterance. The NLU output, i.e. the updated belief state, for a dialogue turn may comprise a probability score for one or more slot-value pairs.

Figure 4:
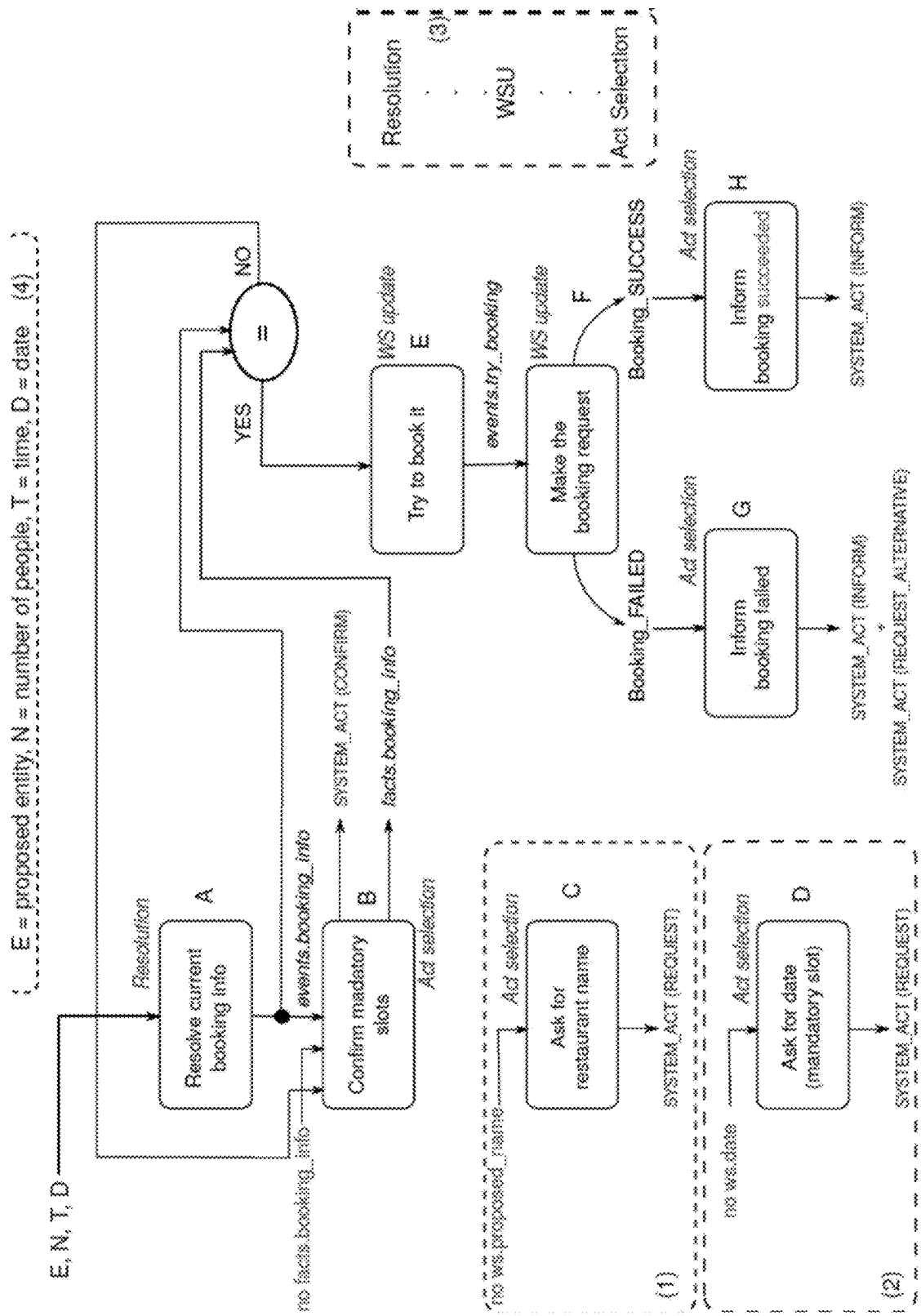
FIG. 4 is a schematic illustration of a method based on a restaurant booking scenario in accordance with an embodiment.
Figure 5:
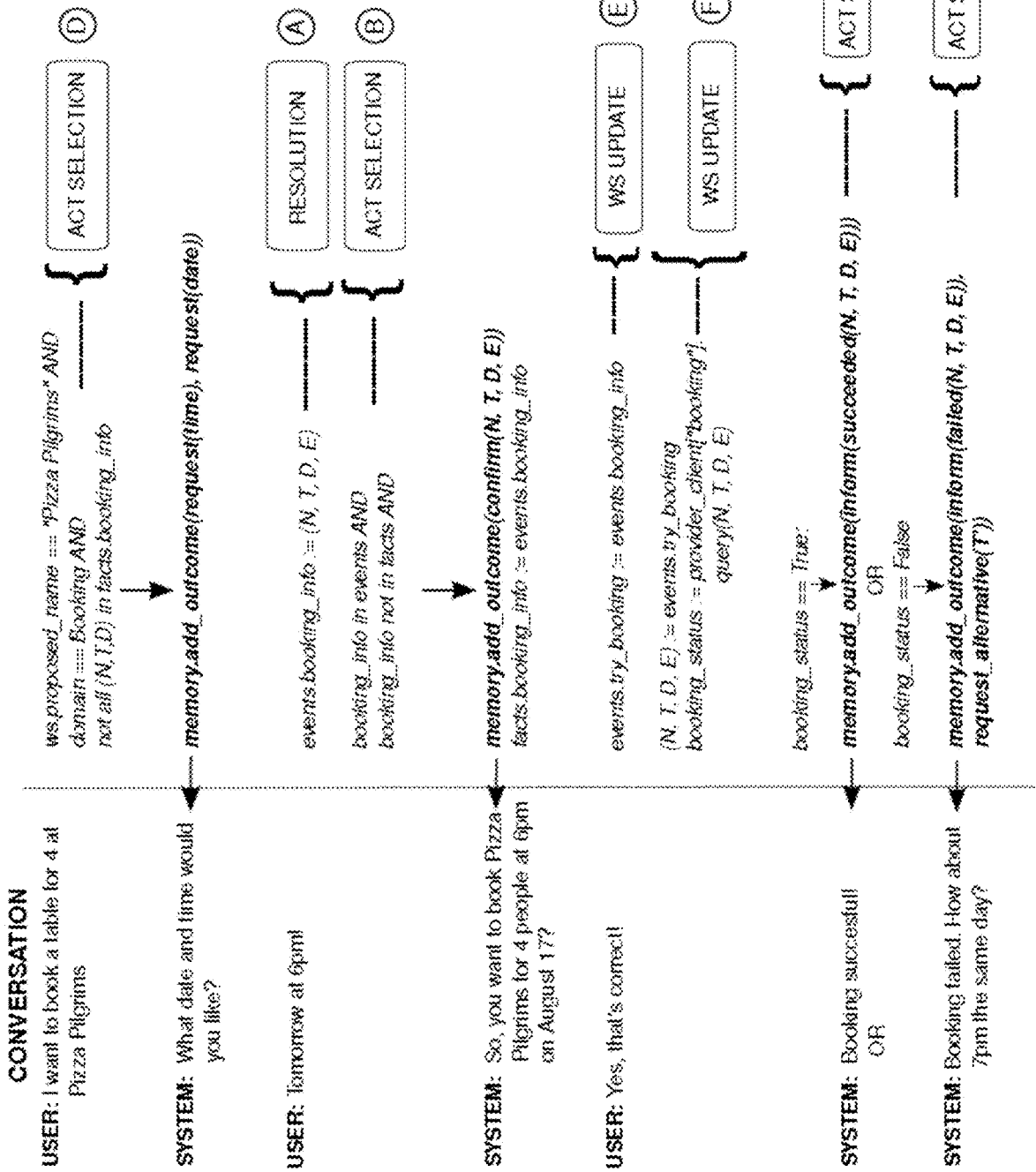
FIG. 5 is a schematic illustration of a method based on the restaurant booking scenario in accordance with an embodiment.

In S303 a dialogue act is determined, by applying a plurality of rules to world state information. Rules are also applied to belief state information. An example method based on a restaurant booking scenario will be described below in order to illustrate this step, and is also shown in FIGS. 4 and 5. The rules are applied in stages, as described previously. In an embodiment, the stages comprise:
1. Initialisation;
2. First world state update (or resolution);
3. Second world state update (based on external information);
4. Act selection.

The world state may be updated in all four stages. In the initialisation stage, world state information is initialised, through application of the rules in this stage. In the first world state update stage (or resolution stage) the world state is updated based on the belief state information and any other information extracted from the user utterance. In the second world state update stage, the world state is updated based on external information. In the act selection stage, as well as selecting acts, the rules may also specify further world state updates, for example storing a list of the selected acts.

In a further embodiment, an additional "act decoration" stage may be included after act selection. This optional further stage will be described in more detail below. Alternatively or additionally, a further stage of final act selection, based on importance, may be included after initial act selection (and prior to act decoration if included). This optional further stage will also be described in more detail below.

Each stage comprises one or more rules. The stages are performed in order, thus after a user utterance has been received and the belief state updated, the rules in stage 1 are applied, followed by the rules in stage 2 and so on. Although these specific stages are described in relation to a booking scenario example, the same stages may be used for other scenarios, for example search scenarios.

Each rule may comprise a condition relating to the world state information and/or belief state information. If the condition is fulfilled, the rule triggers, and the step specified in the rule is performed. The step may comprise a particular dialogue act being selected, an update to the world state being made or a third party call being made for example, as will be described in relation to the example below.

The world state comprises information relating to the dialogue, in particular information relating to the current conversation status or the current point of the dialogue. It can be considered as comprising information relating to a collection of "conversation checkpoints". It comprises the information known about the dialogue at any stage, for which logical propositions can be made. The term "world" refers here to the domain ontology and sets of user and system dialogue acts, as well as any additional relevant information. For example, the world state can keep track of the information related to the user confirming the booking information. The world state may comprise information from different sources, including one or more of:
1. database information,
2. third-party API feedback (for example information returned in response to a booking request sent to a third party system, for example a restaurant booking system),
3. the updated belief state information output from the previous step,
4. any other information extracted from the input user utterance (for example an estimate of the user act type or of the requestable slots mentioned); and
5. dialogue history information (i.e. previous user acts and system acts).

In other words, the world state comprises internal information from the dialogue (including the belief state information, other information extracted from the user utterance and the dialogue history), but also information conditioned on the external world (including the database information and the third-party feedback for example). The information referred to in point 5 comprises information relating to elements of logical conversation flow (e.g. the dialogue has locked on to a specific restaurant that is now being discussed). For example, in the search scenario: if the system suggested a restaurant/entity to the user and the user asked for an alternative place after that, that restaurant X is included into a list banned entities stored in the world state.

When sampling another random suggestion from the list of matched entities, the system will not consider the entities in the list of banned entities. This information is not stored in the belief state, but in the world state, and represents the dialogue history (i.e. that the user gave a request alternative act).

Database information may comprise information relating to the entities which may be searched and/or booked, for example restaurant information. The database may store the values corresponding to each entity (e.g. area, food, price etc) as well as information corresponding to the requestable slots (e.g. name, address etc).

The third party API feedback information relates to one or more executable third-party queries that depend on the external world e.g. to try to do an action and report success/failure. The outcome of these actions may be used to update the world state according to one or more rules. For instance, the world state may store that the current proposed entity is X (Proposed_Entity=X), but the attempted booking at the restaurant X at a particular time slot, date, and the number of people failed (BOOKING=Failed), as will be explained in more detail in relation to the example.

The world state information may be updated after a user utterance is inputted based on the updated belief state and any other information extracted from the input user utterance, for example the estimated dialogue act type. The belief state is updated in S302 for each dialogue turn, as has been described above.

The world state may comprise "general" type information and "scenario-specific" type information. For example, general information may relate to the current status of the dialogue, for example one or more of: conversation end, flag of the current scenario (is it browsing/searching or booking?). In the searching scenario, the world state may comprise "scenario specific" information relating to one or more of: the currently proposed entity and the list of banned entities (i.e. entities in which the user is definitely not interested according to the history of current conversation). In the booking scenario, the world state may comprise "scenario specific" information relating to one or more of: the booking action status, whether all mandatory slots are filled in and the currently proposed/targeted entity.

The world state may comprise "fact" type information, i.e. information that remains across different turns and "event" type information, i.e. information that remains only for the current turn. Fact type information is used to keep track of the conversation history, and comprises information such as booking_info or banned_entities for example. Fact type information may be accumulated and/or updated across dialogue turns during the conversation. Event type information is not propagated across turns. For instance, possible events could be matched_entities (i.e. need information on the current result from the database search query) or mentioned_name (i.e. need information on the current intent expressed by the user). The matched_entities information is relevant for the search scenario. Given the current search constraints, in each turn it is reassessed which entities match the constraints. In the booking scenario, the latest booking_info is stored in events (shown in the example below). The mentioned_name information is also related to the searching scenario. For instance, if the user asks "Could you give me the address of restaurant X?", the mentioned name X is stored in events (only for that turn). Events are reset after each turn and are used to determine whether a condition in a rule is fulfilled. Facts and events are not exposed to any other component in the entire task-based system pipeline (for example SLU, ASR) but is used to determine the next system act.

The information stored in the events and facts is used when checking the conditions in one or more rules: for instance, the information stored in the mentioned_name event is used to check if the restaurant is in the matched_entities list in a searching scenario. The rules and conditions are described in more detail below in relation to a booking scenario example. The world state maintains information about the dialogue, which is used to condition the firing of rules. In other words, the conditions in one or more of the rules are evaluated based on information in the world state. The information stored in the world state is thus used to make propositions about the world which consequently condition the firing of rules. As explained below, the triggering of the rules depends on their condition being satisfied. The conditions may be based on the belief state and/or any other information extracted from the input user utterance (for example an estimate of the user act type or of the requestable slots mentioned) and/or the world state information.

In the booking scenario example, the initialisation stage may comprise one or more rules to set world state information to default values, or to identify fundamental information relating to the task.

For example, information identifying the task may be set in the world state in the initialisation stage. For example, a simple classifier which predicts the current task may be run each dialogue turn (for example a binary classifier configured to predict between a booking task and a searching task). The output of this classifier is then used to update the "task" information (also referred to as "domain" information) stored in the world state in the initialisation stage. In FIG. 5, it can be seen that "domain" is set to "booking" for example. This is done in the initialisation stage of the first dialogue turn.

One or more event or fact type information types may be set to default values.

In a booking scenario, the initialisation stage may comprise a further rule, setting the proposed entity name in the world state. This rule may be conditioned on the proposed name in the world state being empty. For example, the rule may set the proposed name to the name with the highest probability value in the belief state.

Other rules setting default values or fundamental information in the world state can be included in the initialisation stage.

The resolution stage, or first update stage, comprises rules relating to resolving the information extracted from the input user utterance, for example in the updated belief state, and storing it in the world state. In this step, information from the updated belief state is stored in the world state. The information is stored as event type information, and therefore may be updated every dialogue turn, during the resolution stage. One or more slot value combinations determined to be set in the belief state may be stored in the events information in the world state.

In the booking scenario, information from the current belief state is stored into the world state information labelled "events.booking_information", using a second rule or group of rules. In this step, it is determined whether one or more "mandatory" slots (i.e. slots relating to information predefined as being required in order to make a booking) are set in the belief state. A slot value combination may be determined to be set in the belief state if the probability value corresponding to the combination is greater than a threshold value. In an embodiment, the threshold value is 0.6. The threshold value is a hyperparameter that can be changed however. The resolution step is shown in stage A in FIGS. 4 and 5.

The resolution stage may comprise a rule retrieving the value with the highest probability for each mandatory slot from the belief state information. These rules may comprise the following conditions: firstly that the proposed entity name (ws.proposed_name) is set in the world state, and secondly that the mandatory slot is set in the belief state (i.e. according to the threshold described above). If these conditions are met, the mandatory slot in the world state is updated to the value with the highest probability. This information is stored as events information in the world state (events.booking_information, also referred to as events.booking_info).

In an embodiment, a single rule corresponding to all the mandatory slots may be used, comprising the following conditions: firstly that the proposed entity name (ws.proposed_name) is set in the world state, and secondly that the mandatory slots are set in the belief state (i.e. according to the threshold described above). If these conditions are met, the entity name ("name") is updated to the proposed name in the world state and the mandatory slots are updated to the values with the highest probability.

The act selection stage comprises rules that relate to act selection. The act selection stage may comprise one or more rules comprising a condition that: if a mandatory slot has not been specified, a request act for the slot value is triggered. In the restaurant booking example, one or more of the following rules of this type may be included in the act selection stage:

1a. If "Restaurant name" not specified, request "Restaurant name";
1b. If "Date" not specified, request "Date";
1c. If "Time" not specified, request "Time";
1d. If "Number of people" not specified, request "Number of people".

This first group of rules relates to the specification by the user of mandatory information. The first group of rules is in the act selection stage. The information listed is provided as an example. As can be readily seen any number of mandatory slots may be pre-specified for a particular dialogue scenario, and an equivalent rule corresponding to each mandatory slot can be included. In this booking scenario example, the booking can proceed only if the user has specified the following mandatory slots: the restaurant (proposed entity E), number of people to dine (N), the exact date for the booking (D), and the exact time (T). One or more of these rules may be combined.

These rules are applied at each dialogue turn during the act selection stage (i.e. after the initialisation stage, the resolution stage and the world state update stage). Since they are all in the same stage, they may be applied at the same time, or in an arbitrary order for example. Applying each rule in this group comprises determining whether the information in the world state fulfils the condition. If the information fulfils the condition, the rule is triggered and the corresponding request act is selected as an outcome.

For example, the act selection stage may comprise one rule which is conditioned on the proposed entity name (ws.proposed_name) in the world state not being filled. If triggered, an act requesting the entity name is selected as an outcome. The act selection stage may comprise a further rule conditioned on the proposed entity name being filled, but not all the mandatory slots existing in the belief state. The rule returns the mandatory slots not included in the belief state, and a request act relating to these slots is selected as an outcome. The request act may comprise all the slots. Alternatively, the rule may further specify a maximum slot number to be requested in one act. The maximum slot number may be sampled (randomly selected with a value less than or equal to the number of mandatory slots).

In FIG. 4, relating to the booking example, stages C and D show the case where the restaurant name and date are not specified respectively. As can be seen, a request act is selected in each case. FIG. 5 shows the case where the first dialogue turn corresponds to stage D, i.e. the condition "If "Date" not specified" is fulfilled. Thus the first group of rules relate to blocks 1 and 2 in FIG. 4. If the proposed entity is not set (i.e. still do not know which restaurant is the intent of the user, this information is not available in the world state), the rule "Ask for restaurant name" will fire and one outcome will be the system act requesting the actual restaurant name (Block 1).

In an embodiment, each mandatory slot corresponds to a separate rule in the act selection stage. If the condition for two or more of the rules in the first group is met, the two or more corresponding request dialogue acts may all be selected. The dialogue act may then correspond to the two or more request dialogue acts (i.e. a composite dialogue comprising a request for two or more mandatory slots is generated).

An additional stage of determining a final dialogue act from the set of one or more outcomes selected in the act selection stage may alternatively be included. For example, this stage may comprise selecting outcomes with the highest importance score. Importance scores are predefined associated with each outcome. The further stage may comprise a rule which compares the importance scores of the selected outcomes and generates a final dialogue act comprising the outcome(s) with the highest score. Of course, the importance may be pre-specified in any manner desired by the developer, such that composite acts comprising various combinations may be generated. The importance and implementation of act selection based on importance will be described in more detail below.

The act selection stage may comprise a third rule comprising a condition that if the information in the world state relating to the current belief state (events.booking_info) and the information in the world state relating to the previous belief state (facts.booking_info, also referred to as "facts.booking_information") do not match, the dialogue act comprises a confirmation. In the restaurant booking example, the third rule may be:

3. If "event booking info" and "fact booking info" do not match, confirm "booking info".

This corresponds to the option "NO" in stage I of FIG. 4, which leads to the "confirm mandatory slots" dialogue act in stage B of FIG. 4, and is also shown in stage B of FIG. 5.

This rule is in the act selection stage, and therefore is applied after the world state update stage. Thus, in a single dialogue turn, where the belief state comprises all the mandatory information, this information may be resolved and stored in the "events.booking_info" (in the resolution stage) and then a confirm act issued in the act selection stage.

The third rule may comprise a further effect, whereby fulfilling the condition for triggering the confirmation act also sets the global cross-turn variable "facts.booking_info" to the most recent information, i.e. the information from events.booking_info.

The third rule may be conditioned on the booking information being stored in the world state events but not in the world state facts, or the facts booking information being different from the events booking information. If the rule fires, the facts booking information is updated to events booking information, and the confirmation act is issued. The outcome of the confirmation act is added to the world state in the next dialogue turn.

The world state update stage may comprise a fourth rule comprising a condition that if the information in the world state relating to the current belief state and the information in the world state relating to the previous belief state match, a booking action is taken, the world state being updated based on the outcome of the booking action. In the restaurant booking example, the fourth rule may be:

4. If "event booking info" and "fact booking info" match, perform booking action and update world state based on outcome of booking action.

This rule will trigger in the dialogue turn after the confirm act is issued, if the user confirms the same booking information.

The fourth rule may be implemented in two parts, a first part conditioned on: "try_booking" is not in the world state event information, and that the "event booking info" and "fact booking info" both exist in the world state and are the same. If this rule fires, "try_booking" is updated with the booking information. The second part of the fourth rule is conditioned on "try_booking" being in the world state event information, and performs the booking action based on the booking information by communicating with the third party system, and updates "events.booking_succeeded" to (name, time, date, people) if the booking succeeds, or updates alternatives=list(booking_result ["alternative"].items()) and "events.booking_failed"=(name, time, date, people, random.choice(alternatives)) if the booking failed. The flag "try_booking" is used to ensure that only one attempt at booking is made with the same information. In this case, as well as noting that the booking has failed, the system also stores possible alternative options (for example alternative times suggested by the third party booking system). This is optional however, and the system may just store that the booking failed.

Thus the resolve rule will trigger based on the user input, and "events booking info" will be updated corresponding to the updated belief state information. Since "facts booking info" was updated in the previous dialogue turn, "facts booking info" and "events booking info" will now match (assuming the user confirms the same information). The third rule will not trigger during the act selection stage, but the fourth rule will trigger in the world state update stage in this case.

The third rule and fourth rule both comprise a condition whereby whether the information stored in events.booking_info corresponds to information currently present in facts.booking_info is checked. As explained above, event information is retained only in one single turn, while facts store global information and persist across multiple turns. The third rule and the fourth rule are both evaluated in I of FIG. 4.

If the information in the world state relating to the current belief state (i.e. the events.booking_info, updated in the current turn) and the information in the world state relating to the previous belief state (i.e. the facts.booking_info, updated in a previous turn) are determined not to match the dialogue act comprises a confirmation. The case where they do not match corresponds to two different scenarios.

The first scenario is that facts.booking_info does not contain any information. It is thus not equal to events.booking_info, which contains the (resolved) belief state information from the current turn, and the condition is satisfied to trigger a "confirm mandatory slots" rule. This Act Selection layer rule (i.e., "Confirm mandatory slots") is enabled only if the previous "Resolve current booking info" has been fired based on the hierarchical multi-stage approach.

The second scenario is that facts.booking_info contains information which is different to what the user expressed in her/his latest utterance (i.e. stored in events.booking_info). For example, the user did not confirm the same booking info but provided different booking info. This means that the user has decided to change some information compared to what was said earlier in the conversation. If this is the case, the "Confirm mandatory slots" act again triggers and the confirm system act is issued. In both cases, facts.booking_info is set to the most recent information.

This rule means that in the booking scenario, an explicit confirmation from the user (i.e., an affirmative response after the issued confirm act which confirms all mandatory slots) must be received before proceeding with the booking. However, this step may be omitted by re-designing the rules (e.g., proceeding with booking without the explicit confirm). Further constraints may additionally or alternatively be imposed. The rules mechanism enables the developer to fine-tune desired system behaviours and affect the possible conversation flow.

If the information in the world state relating to the current belief state and the information in the world state relating to the previous belief state match, a booking action is taken and the world state is updated based on the outcome of the booking action as specified in the fourth rule. In other words, if facts.booking_info is the same as events.booking_info, this means that the confirmation has been received (i.e., that the system has issued the confirm act which was affirmed/okayed by the user). This signals that the system can proceed to the booking. This corresponds to the option "YES" in stage I of FIG. 4, which leads to the booking action in stages E and F of FIGS. 4 and 5.

The booking action may comprise the system issuing a third party call. For example, it may comprise communicating with the selected restaurant's system to determine whether it is possible to make the reservation for the current (N,T,D) combination. The booking action may be "Make the booking request", which was conditioned on the Boolean events.try_booking variable).

The booking action may have multiple outcomes. For example, in this case, there are two possibilities: the booking request succeeds or the booking request fails. The fourth rule specifies the step that the world state is updated based on the booking action outcome.

The act selection stage may comprise a fifth rule and a sixth rule, whereby the dialogue act comprises informing of the outcome of the booking action stored in the world state.

If the information in the world state relating to the booking action outcome indicates success, the dialogue act comprises inform booking succeeded. This is shown in stage H of FIGS. 4 and 5. In the restaurant booking example, the fifth rule may be:

5. If "booking status" is success, inform booking success.

This rule is conditioned on "booking_succeeded" in the world state event information, and may inform the user of the booking information.

If the information in the world state relating to the booking action outcome indicates fail, the dialogue act comprises inform booking failed. This is shown in stage G of FIGS. 4 and 5. In the restaurant booking example, the sixth rule may be:

6. If "booking status" is fail, inform booking fail and request alternative.

This rule is conditioned on "booking_failed" in the world state event information, and may inform the user of the failed booking and request an alternative.

Thus if the booking request succeeds, the system fires the "Inform booking succeeded" rule which will inform the user about the success and if the booking request fails, the system then fires the "Inform booking failed" rule, which informs the user about the failure. Since these rules are in the act selection stage, they are performed after the fourth rule, in which the booking action is performed and the world state updated.

In the above sixth rule, there is a composite outcome, comprising an inform act and a request act. Where the system has received alternatives from the third party system as part of the booking action, the composite outcome may instead comprise two inform acts (one to inform that the booking failed and one to inform of one or more alternatives provided by the third party system).

In both of these cases, the rule automatically selects a composite outcome. Alternatively however, a separate further stage of determining whether to add auxiliary or decorator acts may be included. In this case, the "main act" inform booking fail is selected in the act selection stage and this is stored in the working memory. The subsequent "act decoration" stage may comprise a rule whereby if the selected act is "inform booking fail", a sampling step is performed to determine whether the dialogue act further comprises a request act (or alternatively an inform of alternatives act). For example a random sampling based on some pre-defined probability distribution may be performed. If a request act is included, the system asks the user to provide alternative values for one or more of the mandatory slots (for example an alternative time). The request alternative act is added to the inform act to form a composite dialogue act. This is shown in stage G of FIG. 4. Alternatively an inform act can be included, if alternatives have been received from the third party system.

These further acts (request and inform) may be examples of "auxiliary" acts or "decorator" acts. The main act (in this case inform booking status failed) is selected based on the rules in the act selection stage, optionally including the importance as will be described below. A separate stage of determining whether to add one or more of the auxiliary acts tied to the selected main act may then be performed (the act decoration stage). One or more of the main acts (selected during the act selection stage) will always be part of the next system utterance. The auxiliary acts may enable a more varied behaviour by the system, as the system may decide to drop or keep the decorating act. This decision may be made based on a pre-specified parameter controlling how verbose and proactive the system agent is. A further stage including a rule determining whether there are any auxiliary acts associated with the selected outcome is performed, including determining whether to include any of the auxiliary acts. This may be based on a pre-specified parameter for example.

Further general rules may be included in the act selection stage, for example, a rule setting a bye act when the conversation is determined to be completed may also be included. For example, a rule conditioned on the user_action.act_type=FINISHED and "user_action.probability">0.7 for example. A further rule setting a "bye and confirm" act when the conversation is determined to be completed with a lower probability may also be included, for example when the conversation is complete with 0.5<user_action.probability<=0.7. In this case, an act 'any else I can help with?' may be issued. The user_action.act_type may be determined by the dialogue act classifier, which identifies the user input act type as has been described above. This information may be stored in the event information after each dialogue turn during the world state update stage for example.

As described in relation to the above example, a pre-specified importance score may be used to select the acts. The dialogue act or acts for each turn may be selected from the triggered acts based on the importance score. Thus selection of the dialogue act or acts may be a two stage process, in the first stage the rules for which the conditions are fulfilled determine a set of acts or outcomes, which are stored in the working memory. For example the first group of rules (issuing request acts for missing mandatory information), the third rule (issuing the confirm act), and the fifth and sixth rules (informing the outcome of the booking action) may all be in the initial act selection stage as described above. A second act selection stage, or final act selection stage, is then performed after the initial stage, and may include rules such that act or acts are selected from this stored set of outcomes based on the importance score.

By defining an importance score corresponding to each dialogue act, rather than defining a priority for each rule, conflicts (whereby more than one rule satisfies the same condition) may still be avoided with a simplified and efficient implementation. By defining the importance of possible system acts, it is possible to rank the outcomes and select the most important one or ones. In other words, all matching rules fire and produce their outcomes, the most important outcome or outcomes is then selected based on the assigned importance score. Since there are fewer system acts than rules and they have a more direct effect this is more efficient.

Additionally or alternatively, a rule selecting a default outcome (default dialogue act, e.g. a "can't help" act), conditioned on no outcomes having been selected (i.e. the set of outcomes stored in the working memory being empty) may be included in a "Final act selection" (performed after the initial act selection stage). The selected outcomes from the "initial act selection" stage are stored in the working memory. The rules in the "final act selection" stage may therefore be conditioned on the information stored in the working memory (i.e. separately from the world state).

In an embodiment, additional variability to the system behaviour may be included by adding an additional step in one or more rules, for example to enable the system to sometimes request all mandatory slots in the same act, but sometimes request values only for a subset of slots in one act. This variation may be controlled through random (or hyperparameter-controlled) sampling if there are multiple possible acts of highest importance detected.

Thus composite acts, i.e. where two or more dialogue acts are outputted, may be generated in different ways. A composite act may be generated from two separate rules in the act selection stage (for example where the time and date are not specified, the conditions "If time not specified" and "If date not specified" for the two rules are fulfilled and both corresponding acts are selected). A composite act may be generated from one rule having a composite act as an outcome, for example where two separate mandatory slots are dealt with in the same rule in the act selection stage (for example where the time and date slots are not specified, a request act with both slots is selected). Alternatively, a composite act may be generated from a single rule in the act selection stage, and from one or more rules in the act decoration stage (for example where the condition "booking indicates fail" is fulfilled in the act selection stage, the outcome "inform fail" is selected, and this outcome has an auxiliary act corresponding to the request act which is selected in the act decoration stage). In the first case (where two or more different act selection stage rules select the acts), the system may perform a further rule in a further stage of selecting between the acts based on importance. In the second and third case, the two acts form a single outcome (with a single importance score).

As described in relation to the above booking scenario example, at each dialogue turn, a dialogue act is selected based on one or more rules. The rules may comprise a condition evaluated based on the information in the belief state and/or the world state. If a condition is fulfilled, this may select the dialogue act. Alternatively, this may trigger another type of action (for example a booking action, a resolution step, or a world state update), which in turn leads to a selection of a dialogue act through application of a subsequent rule. Where two or more conditions are fulfilled for different rules, two or more dialogue acts may be selected. Alternatively, the dialogue or acts having the highest importance is/are selected.

In S304, a text signal corresponding to the selected dialogue act or acts is generated. In this step, a natural language generation process is performed. For example, stored utterances mapped to dialogue acts or actions may be used to convert the dialogue acts into natural language text. Alternatively, a data driven trained natural language generation module may be used. As described previously, the text signal generated in S304 may be directly outputted to the user, or may be converted into an audio speech signal, using a text to speech generation process.

The above described method may be implemented using three main components: 1) Working memory; 2) Engine; 3) Rules.

This modular design increases the portability of the entire policy engine. The first two components, working memory and engine, may be domain-independent. These may therefore be applied without further fine-tuning to different domains. The only domain-specific component may be the rules. The rules may also be altered by the developer in order to customise the desired behaviour of the system agent, even within the same domain.

The engine is a component that hosts and triggers the rules based on the world state in the working memory. The engine comprises stored code which accesses and reads the rules and, based on the outcome of each triggered rule, modifies the information in the working memory. The rule firing method is a dependency or graph-based approach that handles "layers" of rules (i.e. the stages including initialisation, resolution, world state update and act selection) and fires the ones that match the conditions. In an embodiment, the engine may be implemented using the RETE algorithm which determines when each rule is applied (i.e. when the condition in each rule is evaluated) within a single stage. Alternatively, the conditions for all rules within a single stage may be evaluated at the same time, for each dialogue turn.

As described in relation to the example above, rules are applied in S303 which determine the system response to the input user utterance. Different scenarios within the same domain (i.e. such as restaurant booking, restaurant searching) might require different rules. Some rules may be shared between scenarios however. A stage relating to an update of a world state and a stage relating to act selection, subsequent to the world state update, are used for all scenarios. The rules are applied based on a hybrid control-/data-flow. This means that the composition of the system response is separated in several stages, which are applied in order in a control flow approach, but within each stage the rules are triggered (i.e. if the condition comprised in the rule is fulfilled) based only on the policy input (for example the belief state information) and/or the world state information.

Figure 6:
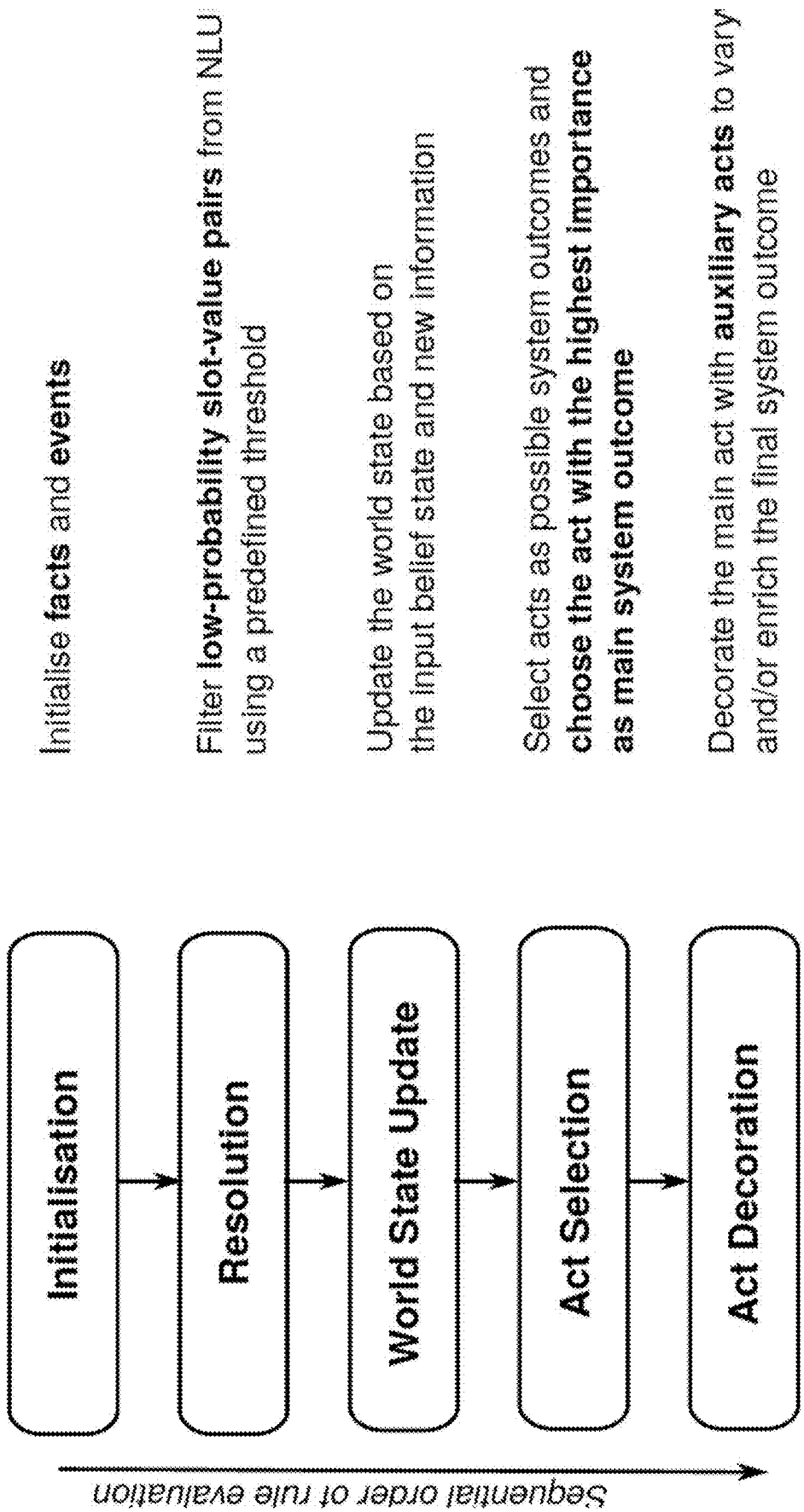
FIG. 6 is an example of the stages used in the policy engine in accordance with an embodiment.

An example of the stages used in the policy engine in accordance with an embodiment is illustrated in FIG. 6. FIG. 4 described above shows the stages as applied to a booking scenario example, using the hierarchical multi-stage processing. In FIG. 4, it is assumed the Initialisation stage has been completed (i.e. no rules trigger in this stage for each dialogue turn). The figure focuses on the three stages of the pipeline: Resolution, World State Update and Act Selection. The hierarchy of execution is 1. Resolution, 2. World State Update, 3. Act Selection.

The multi-layer or multi-stage design allows changes to be made in one layer of the entire pipeline without editing anything else. For instance, the way the information is filtered in the Resolution stage could be changed without having to change any rules in any other stages. The stages may comprise:

1. Initialisation: in which some or all of the facts and events are initialised (for example matched entities, names, request);
2. Resolution: in which the low probability beliefs are filtered using a pre-defined threshold and the world state is updated based on the belief state information and any other information extracted from the input user utterance (for example user act type and/or requestable slots);
3. World state update: in which the world state is updated based on other external information, for example booking action outcomes or database information;
4. Initial act selection: in which the salient act and slot-values are added, where the system outcome(s) are selected and stored in the working memory;
5. Final act selection, where the system outcome(s) with the highest importance are selected, or a default outcome is selected;
6. Act decoration: where it is determined whether to add an auxiliary act such as confirm, request and/or request more.

As described above, stages 5 and 6 are optional. Stage 1 may also be omitted if no default values are required. The rules are thus divided over multiple stages. Rules related to the Act Selection stage cannot be evaluated before the rules from the Resolution and WS Update phase in a single dialogue turn. The full set of rules is thus divided into stages, where the chronology of rule evaluations is determined by the sequence of stages. By dividing the rules into multiple stages, the order of execution is controlled, and a control-flow mechanism is imposed. For example, one "Act Selection" rule condition may be fulfilled immediately with the current world state, however if the world state update is performed first, the information in the world state may change which will preclude this rule from firing and trigger some other rule (which was disabled by the world state before the update). Thus resolution is performed first (in which the world state is updated based on information from the input utterance and updated belief state), followed by the update of the world state based on external information, and only then the final act selection.

Figure 7:
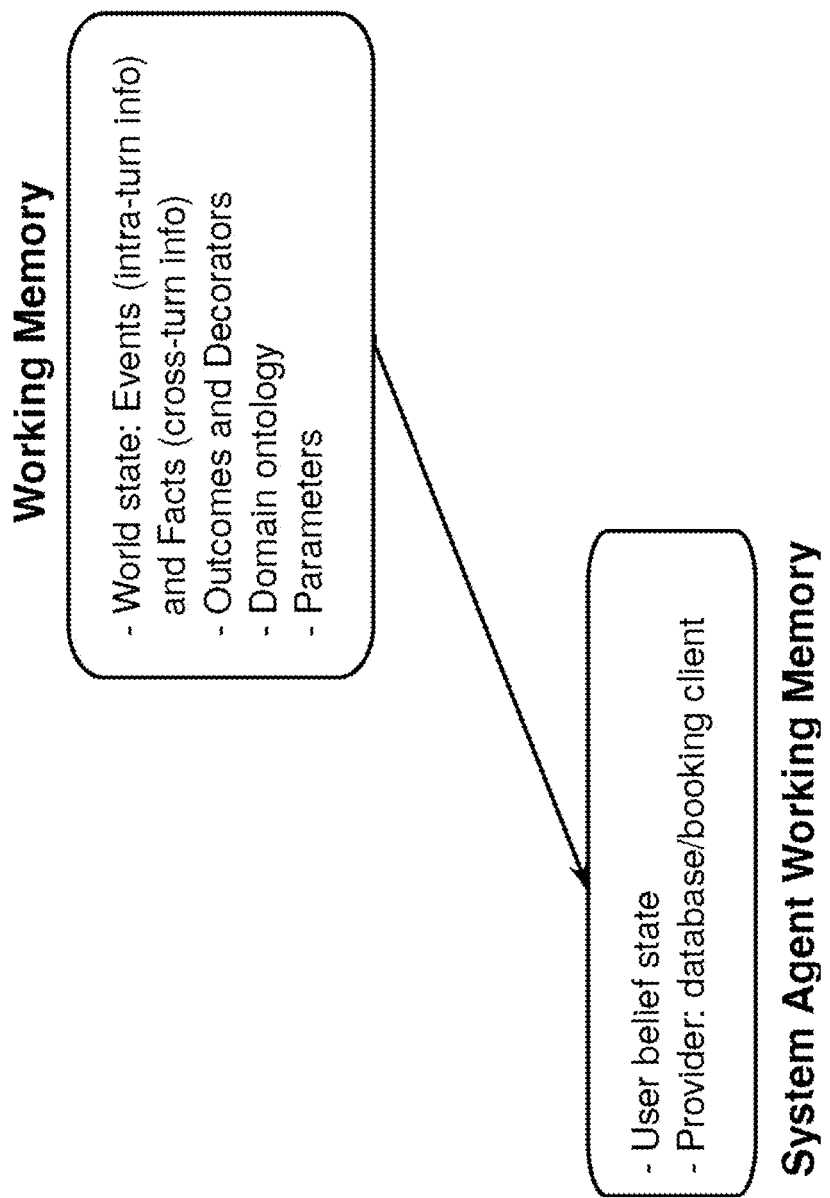
FIG. 7 is a schematic illustration of the information which may be stored in the working memory for the method performed in accordance with an embodiment.

FIG. 7 is a schematic illustration of the information which may be stored in the working memory for the dialogue policy management performed in S303 in accordance with an embodiment. The working memory component interacts with additional information from the system agent side (e.g., user belief state, and 3rd party APIs). The working memory comprises the world state, as described previously. The working memory may also comprise the domain ontology.

The working memory further comprises the selected outcomes. This information may be stored in the world state for example. The outcome information comprises the collection of system outputs, i.e. dialogue acts, that are selected in stage 4 (i.e. in the initial act selection stage). As described above, the dialogue act is selected by applying the rules in the initial act selection stage. As described above, once all the acts are triggered in stage 4, in a final act selection stage 5, the policy engine may select the outcome or outcomes from the stored outcomes with the highest importance score as the next system act. One of the outcomes will always be part of the next system utterance.

One or more "decorator" or "auxiliary" acts may be tied to one or more of the outcomes, as explained previously, and may be included in stage 6. Each outcome may correspond to salient main system act (e.g., OFFER, INFORM). However, additional (auxiliary) "decorating" acts may be added to the main outcome (e.g., adding an auxiliary act CONFIRM in front of the salient outcome OFFER, or an auxiliary act REQUEST after the salient outcome OFFER).

The working memory may further comprise parameters. The parameters allow variation in the behaviour of the system agent. One or more rules may comprise conditions which are dependent on the parameters, or sampling steps which are controlled by the parameters. The parameters may include one or more of:

entity_num_threshold: if there are at most this many matching entities which satisfy the user's constraints, the system will offer one, chosen randomly;
  confirm_prob: the probability of issuing a confirm act;
  request_more_prob: the probability of issuing a request more act after an offer;
  count_prob: the probability of issuing a count act when there's more than one matching entity;
  max_inform_slot_number: maximum number of slots to inform the user;
  max_request_slot_number: maximum number of slots to request from the user.

In an embodiment, one or more of the pre-specified parameters take on the following values:
  entity_num_threshold=10
  confirm_prob=1.0
  request_more_prob=1.0
  count_prob=1.0
  max_inform_slot_number=2
  max_request_slot_number=2.

Developers can specify dialogue management through a simple interface which enables them to add, edit, or tweak rules, and to control policy parameters.

The system agent working memory comprises the belief state and the database. It may further comprise the booking client, used to execute booking actions. The rules are conditioned on information contained in the working memory and in the system agent working memory.

The implementation of the policy engine itself may be domain-independent, whereas the rules may be changed for different domains and scenarios. An example has been described above in relation to the booking scenario. Different rules may be used for a search scenario for example.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A dialogue system comprising:
  an input for receiving input data relating to a speech or text input signal originating from a user during a conversation with the user;
  an output for outputting speech or text information specified by a dialogue act; and
  a processor configured to:
    determine, based on the input signal, a belief state, that comprises information corresponding to one or more dialogue options comprising a slot and a corresponding slot value;
    apply a policy component to the information of the belief state to determine a dialogue act, wherein application of the policy component to the belief state to determine the dialogue act comprises:
      conducting an update stage that comprises applying one or more rules to determine world state information, the world state information comprising:
        world state event information for the input signal that is determined based on the information of the belief state; and
        world state fact information for the conversation that is determined based on the world state event information; and
      conducting an act selection stage that comprises applying one or more rules to the world state information to determine a dialogue act that specifies speech or text information; and
    output, by way of the output, the speech or text information specified by the determined dialogue act determined.

2. The dialogue system according to claim 1, wherein conducting an act selection stage further comprises applying one or more rules to the belief state information.

3. The dialogue system according to claim 1, wherein the policy component is further configured to conduct a second update stage that comprises applying one or more rules to determine world state information based on external information, and wherein the update stage is conducted before the second update stage and the second update stage is conducted before the act selection stage.

4. The dialogue system of claim 1, wherein the update stage or the act selection stage comprise two or more rules.

5. The dialogue system according to claim 1, wherein the one or more rules in the act selection stage comprise at least one rule comprising a condition relating to the world state information and/or belief state information.

6. The dialogue system according to claim 5, wherein if the condition is met, the world state information is updated.

7. The dialogue system according to claim 5, wherein if the condition is met, a particular dialogue act is selected.

8. The dialogue system according to claim 7, wherein if the condition for two or more of these rules is met, the two or more dialogue acts are selected, such that the output speech or text information is specified by the two or more dialogue acts.

9. The dialogue system according to claim 7, wherein if the condition for two or more of the rules is met, the dialogue acts or acts with the highest importance score are selected, such that the output speech or text information is specified by the dialogue act or acts with the highest importance score.

10. The dialogue system according to claim 1, wherein one or more first rules in the act selection stage comprise a condition that if a required slot is not set in the belief state information, the dialogue act comprises a request for the slot value.

11. The dialogue system according to claim 10, wherein there are a plurality of required slots, each corresponding to a first rule in the act selection stage comprising a condition that if the required slot is not set, the dialogue act comprises a request for the slot value.

12. The dialogue system according to claim 10, wherein the first the update stage comprises applying a second rule, wherein the second rule comprises a condition that if all of the required slots are set in the belief state information, the world state is updated based on the belief state information.

13. The dialogue system according to claim 1, wherein the act selection stage comprises applying a third rule, wherein the third rule comprises a condition that if the world state event information for the input signal does not match world state fact information for the conversation, the dialogue act comprises a request for confirmation.

14. The dialogue system according to claim 13, wherein the third rule further specifies that if the world state event information for the input signal does not match world state fact information for the conversation, the world state fact information for the conversation is updated to reflect the belief state information associated with the world state event information.

15. The dialogue system according to claim 13, wherein a second update stage comprises applying a fourth rule, wherein the fourth rule comprises a condition that if world state event information for the input signal matches world state fact information for the conversation, a third party action is taken and the world state information is updated based on the outcome of the third party action.

16. The dialogue system according to claim 15, wherein the third party action is a booking action.

17. The dialogue system according to claim 1,
wherein the update stage comprises:
determining, based on the belief state, first dialogue event information, wherein the world state event information for the input signal comprises the first dialogue event information,
wherein the act selection stage comprises:
determining, based on a comparison of the first dialogue event information to the world state fact information for the conversation, that first dialogue event information is not confirmed;
determining, in response to determining that the first dialogue event information is not confirmed, a first dialogue act that specifies speech or text to request confirmation of the first dialogue event information; and
conducting, in response to determining the first dialogue act, the first dialogue act, the conducting of the first dialogue act comprising outputting, by way of the output, the speech or text to request confirmation of the first dialogue event information.

18. The dialogue system according to claim 17, wherein the act selection stage further comprises:
updating the world state fact information for the conversation to include a first fact that corresponds to the first dialogue event information;
wherein the update stage comprises:

receiving, in response to the request for confirmation of the first dialogue event information, a second input signal that indicates confirmation of the first dialogue event information; and
determining, based on the second input signal, that the first dialogue event information is confirmed.

19. A dialogue method comprising:
receiving input data relating to a speech or text input signal originating from a user during a conversation with a user;
determining, based on the input signal, a belief state that comprises information corresponding to one or more dialogue options, each dialogue option comprising a slot and a corresponding slot value, based on the input signal;
applying a policy component to the information of the belief state to determine a dialogue act, wherein application of the policy component to the belief state to determine the dialogue act comprises:
conducting an update stage that comprises applying one or more rules to determine world state information, the world state information comprising:
world state event information for the input signal that is determined based on the information of the belief state; and
world state fact information for the conversation that is determined based on the world state event information; and
conducting an act selection stage that comprises applying one or more rules to the world state information to determine a dialogue act that specifies speech or text information; and
outputting, by way of an output, the speech or text information specified by the dialogue act determined.

20. A non-transitory computer readable storage medium comprising computer readable code configured to cause a computer to perform the following:
receiving input data relating to a speech or text input signal originating from a user during a conversation with a user;
determining, based on the input signal, a belief state, the belief state that comprises information corresponding to one or more dialogue options comprising a slot and a corresponding slot value, based on the input signal;
applying a policy component to the information of the belief state to determine a dialogue act, wherein application of the policy component to the belief state to determine the dialogue act comprises:
conducting an update stage that comprises, comprising applying one or more rules to determine world state information, the world state information comprising:
world state event information for the input signal that is determined based on the information of the belief state; and
world state fact information for the conversation that is determined based on the world state event information; and
conducting an act selection stage that comprises applying one or more rules to the world state information to determine a dialogue act that specifies speech or text information; and
outputting, by way of an output, the speech or text information specified by the dialogue act determined.

* * * * *

UNITED STATES PATENT AND TRADEMARK OFFICE
CERTIFICATE OF CORRECTION

PATENT NO. : 10,847,141 B2
APPLICATION NO. : 16/678079
DATED : November 24, 2020
INVENTOR(S) : Matthew Steedman Henderson et al.

Page 1 of 1

It is certified that error appears in the above-identified patent and that said Letters Patent is hereby corrected as shown below:

On the Title Page

Item (72) Inventors:
Inigo Casanueva-Perez, London (GB)
Should read:
Iñigo Casanueva Perez, London (GB)

Signed and Sealed this
Fifth Day of December, 2023

Katherine Kelly Vidal
*Director of the United States Patent and Trademark Office*